United States Patent
Bhargava et al.

(10) Patent No.: US 9,432,210 B2
(45) Date of Patent: Aug. 30, 2016

(54) SYSTEM FOR MONITOR AND CONTROL OF EQUIPMENT

(71) Applicant: Zuli, Inc., San Francisco, CA (US)

(72) Inventors: Siddhant Bhargava, Redwood City, CA (US); Taylor Keith Umphreys, Menlo Park, CA (US); Benjamin Jerming Chang, San Jose, CA (US); Paul Morgan Pattison, Gray, TN (US); Ilan Ben-Yaacov, Goleta, CA (US)

(73) Assignee: Zuli, Inc., San Francisco, CA (US)

( * ) Notice: Subject to any disclaimer, the term of this patent is extended or adjusted under 35 U.S.C. 154(b) by 0 days.

(21) Appl. No.: 13/920,022

(22) Filed: Jun. 17, 2013

(65) Prior Publication Data

US 2014/0070959 A1 Mar. 13, 2014

Related U.S. Application Data

(60) Provisional application No. 61/700,005, filed on Sep. 12, 2012, provisional application No. 61/700,023, filed on Sep. 12, 2012, provisional application No. 61/700,034, filed on Sep. 12, 2012.

(51) Int. Cl.

| | |
|---|---|
| *G08C 19/22* | (2006.01) |
| *H04L 12/28* | (2006.01) |
| *H04Q 9/00* | (2006.01) |
| *G05B 15/02* | (2006.01) |
| *G05B 13/02* | (2006.01) |
| *G06N 99/00* | (2010.01) |
| *H04M 1/725* | (2006.01) |

(52) U.S. Cl.
CPC ......... *H04L 12/282* (2013.01); *G05B 13/0265* (2013.01); *G05B 15/02* (2013.01); *G06N 99/005* (2013.01); *H04M 1/72533* (2013.01); *H04Q 9/00* (2013.01); *G05B 2219/2642* (2013.01); *H04Q 2209/40* (2013.01)

(58) Field of Classification Search
CPC ...................................................... H04Q 9/00
USPC ...................................... 340/870.01, 870.07
See application file for complete search history.

(56) References Cited

U.S. PATENT DOCUMENTS

| | | |
|---|---|---|
| 6,792,323 B2 | 9/2004 | Krzyzanowski et al. |
| 6,933,685 B2 | 8/2005 | Gutta et al. |
| 7,184,848 B2 | 2/2007 | Krzyzanowski et al. |
| 7,649,456 B2 | 1/2010 | Wakefield et al. |
| 7,769,910 B2 | 8/2010 | Krzyzanowski |
| 7,933,945 B2 | 4/2011 | Krzyzanowski et al. |

(Continued)

FOREIGN PATENT DOCUMENTS

| | | |
|---|---|---|
| KR | 10-2008-0114147 | 12/2008 |
| WO | WO 2011/131984 | 10/2011 |

OTHER PUBLICATIONS

International Search Report and Written Opinion for International Patent Application No. PCT/US2013/059046, filed Sep. 10, 2013. Received Dec. 30, 2013. 12 pages.

(Continued)

*Primary Examiner* — Amine Benlagsir
(74) *Attorney, Agent, or Firm* — Fish & Richardson P.C.

(57) ABSTRACT

Methods, systems, and apparatus, including computer programs encoded on a computer storage medium, for determining a current location and receiving energy usage information from devices in the location.

29 Claims, 20 Drawing Sheets

(56) References Cited

U.S. PATENT DOCUMENTS

| | | | |
|---|---|---|---|
| 7,941,096 B2* | 5/2011 | Perkins | G06F 19/327 340/539.13 |
| 8,090,477 B1* | 1/2012 | Steinberg | G05D 23/1923 700/276 |
| 8,116,889 B2 | 2/2012 | Krzyzanowski et al. | |
| 8,196,064 B2 | 6/2012 | Krzyzanowski et al. | |
| 8,314,893 B2 | 11/2012 | Ravi | |
| 8,358,976 B2 | 1/2013 | Jung et al. | |
| 8,368,540 B2* | 2/2013 | Perkins | G06Q 10/08 340/10.1 |
| 8,369,998 B2 | 2/2013 | Drake et al. | |
| 8,385,943 B1 | 2/2013 | Han et al. | |
| 2003/0074672 A1* | 4/2003 | Daniels | H04B 1/207 725/110 |
| 2003/0120831 A1 | 6/2003 | Dubil et al. | |
| 2004/0267385 A1 | 12/2004 | Lingemann | |
| 2006/0062424 A1 | 3/2006 | Diederiks et al. | |
| 2006/0179450 A1* | 8/2006 | Trappeniers | H04N 7/163 725/9 |
| 2006/0259184 A1 | 11/2006 | Hayes et al. | |
| 2007/0032225 A1* | 2/2007 | Konicek | H04M 1/72513 455/417 |
| 2007/0073870 A1 | 3/2007 | Park et al. | |
| 2007/0171091 A1* | 7/2007 | Nisenboim | G08C 17/00 340/12.24 |
| 2007/0173978 A1 | 7/2007 | Fein et al. | |
| 2009/0065596 A1 | 3/2009 | Seem et al. | |
| 2009/0076748 A1 | 3/2009 | Robertson et al. | |
| 2010/0191487 A1 | 7/2010 | Rada et al. | |
| 2010/0241284 A1 | 9/2010 | Maeda et al. | |
| 2011/0066297 A1* | 3/2011 | Saberi | F16K 31/046 700/287 |
| 2011/0068892 A1* | 3/2011 | Perkins | G06Q 10/08 340/5.2 |
| 2011/0106279 A1 | 5/2011 | Cho et al. | |
| 2011/0109472 A1* | 5/2011 | Spirakis | G06Q 10/06 340/870.02 |
| 2011/0145611 A1* | 6/2011 | Lee | G01R 22/10 713/320 |
| 2011/0201270 A1* | 8/2011 | Perkins | H04W 4/008 455/41.1 |
| 2012/0066168 A1 | 3/2012 | Fadell et al. | |
| 2012/0109394 A1 | 5/2012 | Takagi et al. | |
| 2012/0188052 A1 | 7/2012 | Rosenblatt et al. | |
| 2012/0264374 A1* | 10/2012 | Perkins | G06Q 10/08 455/41.1 |
| 2012/0316808 A1 | 12/2012 | Frader-Thompson et al. | |
| 2013/0006425 A1 | 1/2013 | Bell et al. | |
| 2013/0099011 A1 | 4/2013 | Matsuoka et al. | |
| 2013/0103622 A1 | 4/2013 | Matsuoka et al. | |

OTHER PUBLICATIONS

International Search Report and Written Opinion for International Patent Application No. PCT/US2013/058919, filed Sep. 10, 2013. Received Dec. 27, 2013. 14 pages.

U.S. Appl. No. 13/920,042, filed Jun. 17, 2013, System for Learning Equipment Schedules, Bhargava et al.

Feldmann et al, "An indoor Bluetooth-based positioning system: concept, Implementation and experimental evaluation" Jan. 2003, Proceedings of the International Conference on Wireless Networks, ICWN '03, Jun. 23-26, 2003, pp. 1-5.

Kaemarungsi et al, "Properties of Indoor Received Signal Strength for WLAN Location Fingerprinting", Mobile and Ubiquitous Systems: Networking and Services, 2004. Mobiquitous 2004, The First Annual International Conference on Aug. 22-26, 2004, pp. 1-10.

ZigBee Alliance "ZigBee Specification" Jan. 17, 2008, ZigBee Standards Organization pp. 1-604.

Lau et al, "Enhanced RSSI-Based High Accuracy Real-Time User Location Tracking System for Indoor and Outdoor Environments" Jun. 2008, International Journal on Smart Sensing and Intelligent Systems, vol. 1, No. 2, Jun. 2008,, pp. 1-15.

Lim et al, "Zero-configuration indoor localization over IEEE 802.11 wireless Infrastructure" Oct. 4, 2008, Wireless Netw, pp. 405-420.

Valiente-Rocha et al, "Ontology and SWRL-Based Learning Model for Home Automation Controlling," Jun. 16, 2010, Ambient Intelligence and Future Trends, pp. 79-86.

Bluetooth "Specification vol. 0 Specification of the BlueTooth System Experience More" Jun. 30, 2010, Bluetooth Specification 1-2302.

Insteon "Quick Start Guide Insteon® SmartLinc™ Central Controller Model: 2412N" Sep. 5, 2012 "See Ownder's Manual for Warranty Information", 3 pages.

Techibitar, "TV Volume Loudness Guard using Arduino," Feb. 10, 2013, retrieved from the internet on May 17, 2013; URL: <http://www.instructables.com/id/TV-Volume-Loudness-Guard-using-Arduino/>, 5 pages.

Wikipedia "Insteon" retrieved from internet on Mar. 14, 2013, URL:<http://en.wikipedia.org/wiki/Insteon >, 4 pages.

Wikipedia "X10 (industry standard)" retrieved from internet on Mar. 14, 2013, URL:<http://en.wikipedia.org/wiki/X10_(industry_standard) >, 8 pages.

Rip Empson "Apple Acquires Indoor GPS Startup WiFiSlam for $20M" Mar. 24, 2013, retrieved from the internet on Mar. 25, 2013; UR: <Apple Acquires Indoor GPS Startup WiFiSlam for $20M>, 3 pages.

Belkin, "belkin WeMo Switch" retrieved from the internet on Mar. 17, 2013, URL:<http://www.belkin.com/us/p/P-F7C027>, 3pages.

Wikipedia "ZigBee" retrieved from internet on May 5, 2013, URL:<en.wikipedia.org/wiki/ZigBee>, 12 pages.

Atmel "RF4Control—ZigBee RF4CE", retrieved from the internet on May 17, 2013, URL:<http://www.atmel.com/tools/RF4CONTROL-ZIGBEERF4CE.aspx> , 2 pages.

XPL Monkey "Home Automation with xPL", retrieved from the internet on May 17, 2013, URL: <ttp://www.xplmonkey.com/mce.html>, 6 pages.

* cited by examiner

Side View

Perspective View

Top View

Bottom View

SYSTEM FOR MONITOR AND CONTROL OF EQUIPMENT

CROSS-REFERENCE TO RELATED APPLICATIONS

This application claims priority to U.S. Application Ser. No. 61/700,005, filed on Sep. 12, 2012, U.S. Application Ser. No. 61/700,023, filed on Sep. 12, 2012, and U.S. Application Ser. No. 61/700,034, filed on Sep. 12, 2012. The contents of the preceding applications are each incorporated by reference herein in their entirety.

BACKGROUND

This specification relates to monitoring and controlling equipment, and particularly to home and office automation.

SUMMARY

In general, one aspect of the subject matter described in this specification can be embodied in methods that include the actions of wirelessly receiving information by a user device during a first time period from one or more terminal devices that are in range of the user device, wherein each of the terminal devices is configured to monitor a respective piece of equipment associated with the terminal device; determining that the user device is located in a first space of a plurality of spaces of a physical structure based on the obtained information; responsive to determining that the user device is located in the first space, presenting a graphical representation of one or more pieces of equipment that are physically located in the first space wherein each piece of equipment is associated with a different one of the terminal devices; receiving energy usage information from one or more of the terminal devices that are each associated with a respective piece of equipment that is physically located in the first space; and presenting the received energy usage information in the graphical representation. Other embodiments of this aspect include corresponding systems, apparatus, and computer programs.

These and other aspects can optionally include one or more of the following features. Actions can include obtaining respective settings of a first user for one or more of the pieces of equipment that are located in the first space; and wirelessly communicating by the user device the respective settings to one or more of the terminal devices that are each associated with a respective piece of equipment located in the first space wherein the terminal devices are further configured to implement the settings. Actions can include determining, during a second time period following the first time period, that the user device is located in a second space of the plurality of spaces; and responsive to determining that the user device is located in the second space, presenting a graphical representation of one or more pieces of equipment that are physically located in the second space wherein each piece of equipment located in the second space is associated with a respective second terminal device that is configured to monitor the piece of equipment. Actions can include receiving user selection of the graphical representation of one of the pieces of equipment located in the first space or of a graphical representation of a control for one of the pieces of equipment located in the first space; and responsive to the user selection, changing one or more settings for the selected piece of equipment. Actions can include receiving a user voice command identifying a piece of equipment in the graphical representation; and responsive to receiving the command, changing one or more settings for the identified piece of equipment based on the command. Presenting the graphical representation of the one or more pieces of equipment that are physically located in the first space can comprise presenting a floor plan for the first space wherein the floor plan indicates a respective location of each piece of equipment located in the first space. Actions can include receiving user selection of one of the pieces of equipment indicated on the floor plan of a graphical representation of a control for one of the pieces of equipment indicated on the floor plan; and responsive to the user selection, changing one or more settings for the selected piece of equipment. Each terminal device can be configured to monitor one or more of the following attributes of the respective piece of equipment associated with the terminal device: energy usage, a change in the environment, temperature, humidity, atmospheric pressure, whether the respective piece of equipment is open or closed, and whether the respective piece of equipment is enabled or disabled. One or more of the respective pieces of equipment can be associated with respective settings comprising one or more of: on, off, dimming level, high energy state, low energy state, energy savings mode, temperature, or television channel. The received information can comprise one or more received signal strength measurements of the user device. The user device can be a smartphone or a tablet computer. Actions can include wirelessly receiving, by a particular one of the terminal devices, a communication from the user device wherein the communication includes settings for a respective piece of equipment associated with one of the terminal devices; and determining, by the particular terminal device, that the respective piece of equipment is not associated with the particular terminal device; and wirelessly forwarding, by the particular terminal device, the communication to another terminal device. The respective piece of equipment can be an appliance, a light, a door lock, a thermostat, or a media controller. The graphical representation of the one or more pieces of equipment can further comprise presenting energy usage information for one or more pieces of equipment that are physically located in one or more spaces other than the first space. The respective piece of equipment can be associated with the terminal device when the terminal device is physically or wirelessly connected to the respective piece of equipment.

In general, one aspect of the subject matter described in this specification can be embodied in methods that include the actions of identifying, for each of a plurality of users, a plurality of different respective spaces occupied by the user at different times, wherein the determining is performed by a respective user device of the user; determining, for each of the plurality of users, first respective times at which the respective user device of the user sends one or more commands to one or more pieces of equipment in one or more of the respective spaces occupied by the user, wherein the determining is performed by the respective user device; deriving, for each of the plurality of users, a respective schedule of equipment settings based on, at least, the respective first times of the user; and determining, by the respective user device of a particular user, that the particular user is located in a particular space at a particular time and, responsive to the determining, configuring one or more pieces of equipment in the particular space according to the respective schedule of equipment settings for the particular user. Other embodiments of this aspect include corresponding systems, apparatus, and computer programs.

These and other aspects can optionally include one or more of the following features. Identifying can include, for each of a plurality of users, a plurality of different respective spaces occupied by the user at different times: wirelessly receiving information by the user device of the user from one or more other devices that are in range of the user device; and determining that the user device is located in the respective space based on the received information. The respective schedule of equipment settings can specify one or more times that each correspond to one or more settings for one or more pieces of equipment. Actions can include identifying one or more pieces of equipment that are in use during a period of time in which there is no occupancy of a space the piece of equipment is located in based on the occupancy times of the plurality of different respective spaces for each of the users and the first respective times for each of the users. Actions can include scheduling the identified one or more pieces of equipment to be automatically turned off during the period of time. Actions can include identifying a time when a particular user is engaged in an activity while occupying a space; and identifying one or more pieces of equipment in one or more spaces that are not needed for the activity. Actions can include scheduling the identified pieces of equipment to be automatically turned off during the activity. The activity can be watching a movie, opening a window, playing a computer game, or playing music. Actions can include calculating energy use for a first user based on the first respective times of the first user; calculating energy use for a second user based on the first respective times of the second user; comparing the energy use of the first user and the second user and determining that the energy use of the first user is greater than the energy use of the second user; and providing a suggestion for changing the respective schedule of equipment settings of the first user based on the respective schedule of equipment settings of the second user. The user device can be a smart phone or a tablet computer.

In general, one aspect of the subject matter described in this specification can be embodied in methods that include the actions of detecting that a first user and a second user are both present in a particular space of a physical structure, the space comprising one or more terminal devices each being coupled to a respective piece of equipment and having a respective first configuration; selecting one of the first user and the second user wherein the selected user entered the particular space before the other user; obtaining one or more second configurations associated with the selected user, wherein each of the second configurations specifies respective configuration parameters for one of the pieces equipment; and wirelessly communicating, by a user device, each second configuration to a different terminal device wherein the terminal device is configured to receive the second configuration wirelessly from the user device and configure the piece of equipment coupled to the terminal device with the second configuration. Other embodiments of this aspect include corresponding systems, apparatus, and computer programs.

These and other aspects can optionally include one or more of the following features. Selecting one of the first user and the second user can comprise: selecting one of the first user and the second user based on respective priorities of the first and second users. Actions can include detecting that the selected user has left the particular space; and restoring the respective first configuration for the each of the pieces of equipment that was configured with a second configuration.

In general, one aspect of the subject matter described in this specification can be embodied in methods that include the actions of determining, by a user device, that the user device is located in a first space of a plurality of spaces of a physical structure; obtaining one or more respective configurations for a current user of the user device for one or more of pieces of equipment that are physically located in each of the one or more spaces, wherein each piece of equipment is associated with a respective terminal device that is configured to implement received configurations for the associated piece of equipment; receiving, by the user device, information indicating a current activity of the user; modifying one or more respective configurations based on, at least, the current activity of the user; and wireless communicating by the user device the modified respective configurations to one or more of the terminal devices. Other embodiments of this aspect include corresponding systems, apparatus, and computer programs.

These and other aspects can optionally include one or more of the following features. The activity can be playing a video, playing an electronic game, activating a media controller, opening or closing a window or a door, adjusting a thermostat, turning an oven on or off, turning a fan on or off, or entering a bedroom after a particular time. Modifying one or more respective configurations based on, at least, the current activity of the user can comprise: changing one or more of the configurations to: decrease or increase light output of one or more lighting pieces of equipment, raise or lower a thermostat piece of equipment, or disable or put into a power saving mode one or more pieces of equipment. Actions can include sending a message to the user in response to detecting the activity. The message can indicate that the user should close a window or prepare for inclement weather. Detecting the current activity of the user can be performed by a user device. Detecting the current activity of the user can be performed by one of the respective terminal devices.

In general, one aspect of the subject matter described in this specification can be embodied in methods that include the actions of determining, by a user device, that the user device is located in a first space of a plurality of spaces of a physical structure; obtaining respective configurations for one or more of pieces of equipment that are physically located in each of the one or more spaces, wherein each piece of equipment is associated with a respective terminal device that is configured to implement received configurations for the associated piece of equipment; obtaining, by the user device, a sensor measurement of a sensor in the user device; modifying one or more of the respective configurations based on, at least, the sensor measurement; and wireless communicating by the user device the modified respective configurations to one or more of the terminal devices. Other embodiments of this aspect include corresponding systems, apparatus, and computer programs.

These and other aspects can optionally include one or more of the following features. The sensor measurement can be a measurement of motion, ambient light, sound, ambient temperature, global positioning system coordinates, touch, compass direction, direction or intensity of a magnetic field, humidity, atmospheric pressure, luminance, proximity, and orientation. The measurement of motion can indicate a substantially upward or substantially downward motion of the user device. The measurement of sound can indicate a first sound followed by a second sound, wherein the second sound occurs within 5 seconds after the first sound. The measurement of orientation can indicate a substantially up or down orientation of the user device. The sensor measurement can be a measurement of ambient light, a measurement of motion, or a measurement of sound, and wherein modifying the one or more respective configurations comprises modifying the configurations of one or more pieces of equipment that are lights to increase or decrease the light output of the lights based on the measurement. The sensor measurement can be a measurement of ambient temperature or a measurement of humidity, and wherein modifying the one or more respective configurations comprises modifying the configurations of a piece of equipment that is a fan, a heater, or a thermostat.

Particular embodiments of the subject matter described in this specification can be implemented to realize one or more of the following advantages. The system can operate autonomously or it can be controlled by user input received from a user device such as a smart phone, tablet computer, portable computer, or other data processing apparatus. The system can detect the presence of a user in a space and automatically configure equipment in the space according to the preferences of the user. The system can learn preferences of a user over time and automatically control equipment in spaces frequented by the user according to the user's preferences. The system can also monitor energy consumption by the equipment and provide suggestions for controlling equipment to reduce energy consumption.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
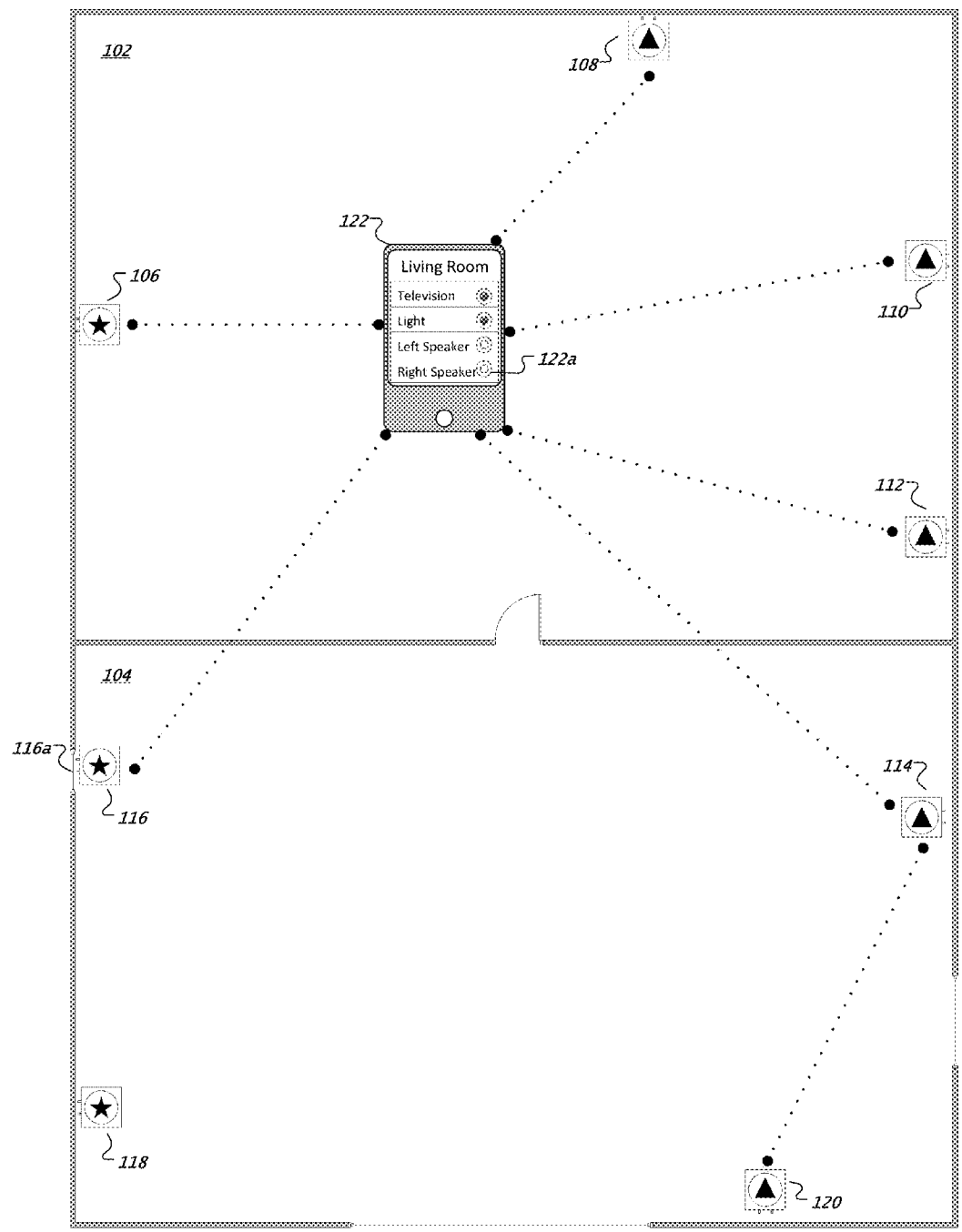
FIG. 1 illustrates example communication of a user device with terminal devices in two example spaces.

FIG. 1 illustrates example communication of a user device 122 with terminal devices in two example spaces (spaces 102 and 104). A space is one or more physical areas inside of, outside of, or both inside and outside of a home, office building, or other structure. A given physical area of a space can be adjacent to one or more other physical areas of the space. For instance, if a space comprises two physical areas, each being on a different floor or level of a building, the floors or levels can be adjacent (e.g., floors 1 and 2) or non-adjacent (e.g., floors 1 and 5). As shown in FIG. 1, space 102 comprises the physical area of the living room of a home and space 104 comprises the physical area of the bedroom of the home. Spaces can be different shapes and sizes and, in some implementations, may overlap with each other. Spaces do not need to be delineated by walls, floors or other kinds of barriers. For example, the spaces 102 and 104 could comprise a single space or a given room in a home could comprise multiple spaces.

A space can contain one or more terminal devices. For example, space 102 contains terminal devices 106, 108, 110 and 112, and space 104 contains terminal devices 114, 116, 118 and 120. A terminal device is a data processing apparatus or other device that is configured to monitor the operation or state of a piece of equipment or of an environment and, in some implementations, control the operation of the equipment. For example, a piece of equipment can be a light, an appliance (e.g., an oven, a slow cooker, a bread maker, a curling iron, and so on), a thermostat, or heating ventilation and air conditioning equipment. By way of illustration, a terminal device can turn a lamp on or off, or dim the lamp's light. Or a terminal device can monitor whether a window is open or closed, for instance. In some implementations, a terminal device includes a microprocessor, one or more radio transceivers, memory, and sensors for monitoring and/or controlling a piece of equipment. Other types of terminal devices are possible. (Terminal devices are described further in reference to FIG. 4.) Terminal devices can use their radio transceiver(s) to communicate wirelessly with user devices (e.g., user device 122), other terminal devices, and equipment that is configured to communicate wirelessly (e.g., a wireless-enabled thermostat or a wireless network hub).

Figure 3:
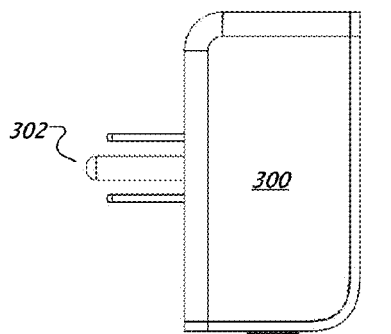
FIG. 3 illustrates the exterior of an example terminal device that is in the form of a smart plug.
Figure 3:
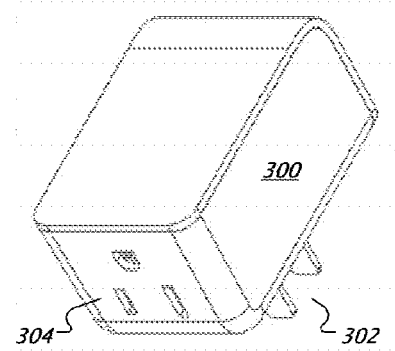
Figure 3:
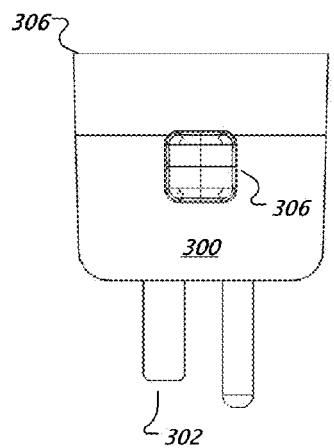
Figure 3:
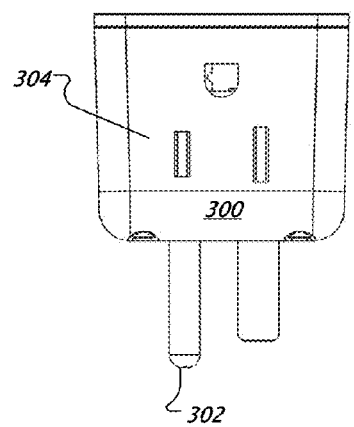

A terminal device can be integrated into a piece of equipment (e.g., a wall socket, a light switch, a window, a door, an appliance) or can be separate device that is coupled physically or wirelessly to a piece of equipment. FIG. 3 illustrates the exterior of an example terminal device that is in the form of a smart plug 300. The smart plug 300 includes a power connector 302 for connecting the smart plug 300 to a power outlet such as a wall socket. The smart plug 300 also includes a power receptacle 304 which accepts the power connector of a piece of equipment. The top, bottom, or side of the smart plug 300 can optionally include a button 306 which, in some implementations, enables or disables the piece of equipment connected to the power receptacle 304 when pressed. The interior of the smart plug 300 includes processors and circuitry for monitoring and controlling equipment that is connected to the power receptacle, and will be described further below with reference to FIG. 4.

Referring again to FIG. 1, and by way of illustration, in space 102 terminal device 106 is coupled to a television (not shown), terminal device 108 is coupled to a ceiling light (not shown), and terminal devices 110 and 112 are coupled to electrically powered speakers (not shown). In space 104, terminal device 116 monitors whether a window 116a is open or closed, terminal device 118 is coupled to a bedside lamp (not shown), terminal device 120 is coupled to a stereo (not shown), and terminal device 114 is coupled to another lamp (not shown). User devices can wirelessly transmit commands ("command packets") to terminal devices to control the respective equipment that is coupled to the terminal devices. For example, the user device 122 can transmit a command packet to terminal device 106 to turn the television on or off. Similarly, the user device 122 can send a command packet to terminal device 108 that instructs the terminal device 108 to dim the ceiling light that the terminal device 108 is coupled to. The term "packet" as used herein refers to information that is transmitted as one or more basic transfer units (or other units) of a communication protocol.

A user device (e.g., the user device 122) is a data processing apparatus such as a smart phone, a tablet computer, a portable computer, or a wearable computing device such as a wristwatch or eye glasses, for example. Other types of user devices are possible. In various implementations, the user device 122 presents a graphical user interface (GUI) that shows equipment coupled to terminal devices in the space the user device is currently located in (e.g., the living room). Alternatively, the GUI can show equipment in a space or spaces of a user's choosing.

The GUI allows a user to monitor state and/or energy usage of equipment coupled to terminal devices and to control the equipment. For example, the GUI shows the current state of the television (on), the current state of the light (on) and the current state of the stereo speakers (off). By way of further example, if a user selected GUI control 122a for controlling the right speaker, the user device 122 would send a command packet to the terminal device 112 in response to the selection to enable (or disable) the speaker coupled to the terminal device 112. User interaction with the GUI can be through touch or keyboard input, voice input, or motion input (e.g., the user moves the user device 122 in a predetermined pattern). Other user interaction is possible. The GUI will be discussed further below in regards to FIGS. 6A-6E.

Terminal devices make their presence known to user devices by wirelessly broadcasting a so-called advertisement packet at various times or when prompted by a broadcast message sent by a user device. In some implementations, the advertisement packet contains the transmit power of the terminal device, a terminal device identifier, status information, and a network identifier. The advertisement packet can contain fewer or additional pieces of information, however. The transmit power is a measure of the transmission power used by the transmitting radio of the terminal device. The terminal device identifier is a unique identifier for every terminal device and can be assigned to the terminal device when the terminal device is manufactured, for example. Alternatively, the terminal device identifier can be assigned to the terminal device when the terminal device is initialized (see FIG. 5). The status information indicates additional data that is available either in the advertisement packet itself or that can be requested from the terminal device. Such information can include, for example, the status of the equipment (e.g., on or off), the current dim level if the equipment is a dimmable light, and information detailing the energy usage of the equipment over time. The network identifier is assigned to the terminal device during initialization of the terminal device and indicates which user or entity initialized the terminal device. Initialization of terminal devices is described further below with reference to FIG. 5.

As discussed above, the user device 122 needs to determine which space the user device 122 is currently located in. In various implementations the user device 122 maintains a mapping between the terminal device identifiers and identifiers of the respective spaces assigned to the terminal devices. (Terminal devices are assigned to spaces during the initialization process as described in reference to FIG. 5.) If the user device 122 only receives advertisement packets from terminal devices that are assigned to the same space (e.g., the living room), then the user device 122 determines that it is currently located in that space. However, if the user device 122 receives advertisement packets from terminal devices in two or more spaces the user device 122 can determine which space it is currently located in as follows.

In some implementations, the user device 122 determines which space it is currently located in based on analyzing received signal strength indicators (RSSIs) of each terminal device the user device 122 receives advertisement packets from. The RSSI is a measurement of the power present in a received radio signal and can be calculated by the user device 122's radio. (Alternatively, the RSSI value is a measure of the power present in the radio signal transmitted by the user device 122 as measured by radio of a respective terminal device. In this scenario the terminal device provides the RSSI value in the advertisement packet to the user device 122, for example.) The RSSI value can be a power ratio in decibels (dBm) of the measured power referenced to one milliwatt (mW). For example, the RSSI can be calculated as follows:

$$RSSI = -(10\ n\ \log_{10} d + A)$$

where n is a signal propagation constant or exponent, d is a distance from the sender and A is the received signal strength at a predefined distance. Other ways of calculating RSSI are possible.

In some implementations, each RSSI value is converted to an estimation of the distance between the user device 122 and the respective terminal device. The distance can be calculated by the communication protocol used by the user device 122 and the terminal devices, for example. In other implementations, each RSSI value is not converted to an estimation of distance since the distance estimation can be inaccurate due to interference. The user device 122 averages the distances (or RSSI values) of terminal devices in the same space and then determines that the space the user device 122 is currently located in is the space having the shortest average distance (or smallest average RSSI value).

By way of illustration, the user device 122 receives advertisement packets from terminal devices that are in range of the user device 122. For example, space 102 terminal devices 106, 108, 110, 112 and space 104 terminal devices 114 and 116 are in range of the user device 122. The user device 122 calculates the average distance (or RSSI value) for space 102 based on the RSSI values for terminal devices 106, 108, 110, 112, and calculates the average distance (or RSSI value) for space 104 based on the RSSI values for terminal devices 114 and 116. If the average distance (or RSSI value) for space 102 is less than that for space 104, then the user device 122 is currently located in space 102. Otherwise, the user device 122 is currently located space 104. If the average distances (or RSSI values) of two or more spaces are close or identical, then one or more of the following approaches can be used to determine the currently location of the user device 122.

In further implementations, the user device 122 determines which space it is currently located in using trilateration. Trilateration is the process of determining absolute or relative locations of points by measurement of distances using the geometry of circles, spheres or triangles. Generally speaking, trilateration involves viewing each terminal device as the center of a circle (two-dimensional trilateration) or a sphere (three-dimensional trilateration). The distance (calculated from the RSSI value) between the user device and each terminal device is the radius of the respective circle or sphere. Assuming there are at least three terminal devices in range of the user device, trilateration can be used to determine what space the user device is in based on the location of the intersection of the circles (or spheres). If the location of the intersection falls in a physical area associated with a space (e.g., space 104), then the terminal device is located in that space. The physical areas that make up a space are charted when terminal devices are assigned to spaces during configuration of the terminal devices (see FIG. 5). In further implementations, terminal devices themselves can determine their location relative to other terminal devices using trilateration based on the RSSI values for the other terminal devices.

In yet further implementations, the user device 122 determines which space it is currently located in using a combination of the above approaches.

Once the current space of the user device 122 is determined, the user device 122 can, in some implementations, present the GUI that shows equipment coupled to terminal devices in the current space. In further implementations, the GUI can show equipment associated with terminal devices that may be out-of-range of the user device 122. A command packet (or other type of packet) sent from the user device 122 will not directly reach an out-of-range terminal device. In some implementations, this limitation is overcome by a mesh network created by the terminal devices that can forward or relay packets.

To create the mesh network, each terminal device listens for advertisement broadcast packets from other terminal devices and creates a routing table populated with information about each terminal device from which it received an advertisement broadcast packet. For example, an entry in the routing table can comprise the terminal device identifier and the network identifier of the terminal device that broadcast the advertisement packet. A given terminal device can send its routing table to each terminal device in its routing table. Likewise, the given terminal device can receive routing tables from other terminal devices. When a routing table is received by the given terminal device, the routes in the received routing table are added to the given terminal device's own routing table. Each entry in the routing table can be expanded to include the identifier of a terminal device through which a "destination" terminal device is reachable if the destination terminal device is not directly reachable from the given terminal device. The mesh network comprises a set of terminal devices that are each reachable directly or indirectly from any of the terminal devices in the set.

If a "source" terminal device needs to send a packet to a "destination" terminal device, the source terminal device first checks its routing table to determine whether it can do so directly. If so, the source terminal device can transmit the packet to the destination terminal device directly. Otherwise, the source terminal device obtains from the routing table the identifier of an intermediate terminal device through which it can reach the destination terminal device and then sends the packet to the intermediate terminal device. The packet will travel from terminal device to terminal device until it reaches the destination terminal device. Other ways of creating and implementing mesh networks are possible.

Returning to FIG. 1, terminal devices 106, 116 and 118 have formed a mesh network (indicated by stars) and terminal devices 108, 110, 112, 114 and 120 have formed another mesh network (indicated by triangles). If the user device 122 located in space 102 wants to send a command packet to the out-of-range terminal device 120 in space 104, the user device 122 can do so by broadcasting the command packet to terminal devices in range or by sending the command packet to one or more selected terminal devices that are in range. A terminal device that receives a command packet that is destined for a different terminal device (based on the destination terminal device identifier in the command packet) can forward the packet according to the scheme above, for example. By way of illustration, in order to have a command packet delivered to out-of-range terminal device 120, the user device can send the packet to terminal device 108, 110, 112 or 114. If the packet is sent to terminal device 114, or if terminal device 114 receives the packet from another terminal device, terminal device 114 will forward the packet to terminal device 120 which will process the packet and implement the command.

Figure 2:
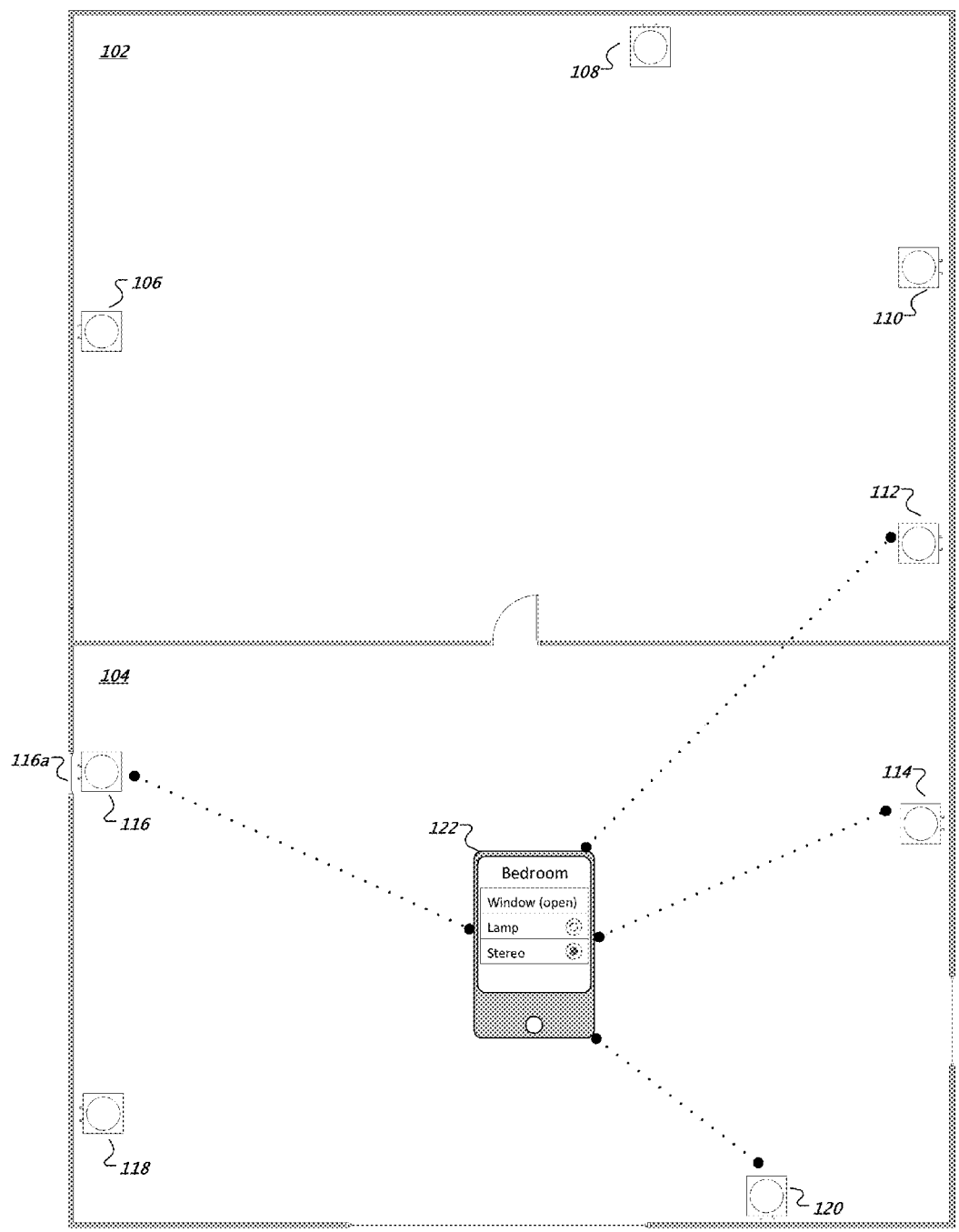
FIG. 2 illustrates example communication of a user device with terminal devices in two example spaces after the user device has roamed into a different space.

FIG. 2 illustrates example communication of a user device 122 with terminal devices in two example spaces after the user device has roamed from space 102 to space 104. The user device 122 can periodically or at other times determine its current location in order to determine whether the user device 122 is in a new location. In this example, the user device 122 receives advertisement packets from terminal device 112 in space 102 and terminal devices 114, 116 and 120 in space 104. The user device 122 uses RSSI measurements of the terminal devices, as described above, to determine that it is currently located in space 104.

When the user device determines that it is in a new location, the GUI can be changed to show equipment coupled to terminal devices in the current space (e.g., the bedroom). In this example, the GUI of user device 122 shows the current state of the window 116*a* (the window is open), the current state of the lamp (off) and the current state of the stereo (on). In some implementations, when a user device leaves a space the equipment in the space is disabled or put into an energy saving mode.

Figure 4A:
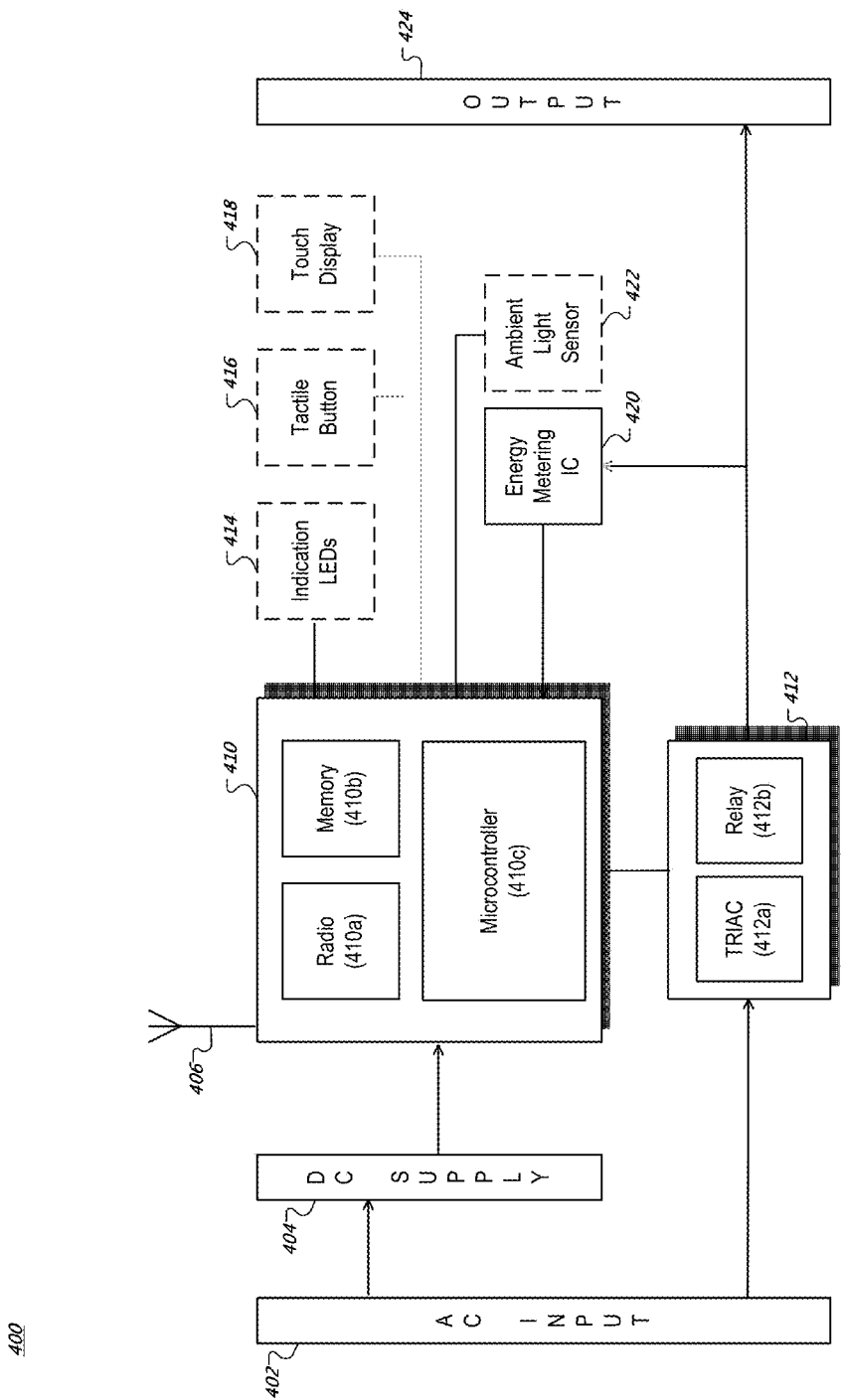
FIG. 4A illustrates components of an example terminal device.

FIG. 4A illustrates components of an example terminal device 400. The terminal device 400 can be integrated into the smart plug 300, a wall outlet, a light switch, or other devices having alternating current (AC) or direct current (DC) powered circuits, for example. The terminal device 400 can contain fewer or more components than those illustrated in FIG. 4A. The terminal device 400 receives AC power input (e.g., from a wall socket) and provides the input to a DC power supply 404 which, in some implementations, is a switched-mode power supply (SMPS). The DC power supply 404 incorporates a switching regulator to convert electrical power while converting voltage and current characteristics.

The output of the DC power supply 404 powers the System on a Chip (SoC) 410 which, in some implementations, comprises a microcontroller 410*c*, a memory 410*b*, and a radio transceiver 410*a*. The radio transceiver 410*a* is configured to send and receive data using the antenna 406. The radio transceiver 410*a* in some implementations operates at 2.4 GHz and supports the Bluetooth® low energy wireless protocol (e.g., Bluetooth® 4.0). Other frequencies (e.g., 3.6 GHz, 5 GHz, 60 GHz, etc.) and protocols (e.g., IEEE 802.11, IEEE 802.16, etc.) are possible. In further implementations, there can be more than one radio transceiver each utilizing the same or different frequency/protocol combinations. The microcontroller 410c can be a 32-bit ARM® Cortex CPU, for example. Other microcontrollers are possible. The memory 410b can include, for instance, Random Access Memory (RAM) and non-volatile Flash memory.

The hybrid AC switching circuit 412 comprises a triode for alternating current (TRIAC) 412a and a relay 412b which is an electrically operated switch controlled by the SoC 410. The TRIAC/Relay 412 controls the power output 424 which, in some implementations, powers the piece of equipment that is physically coupled to the terminal device (e.g., coupled to power receptacle 304 of smart plug 300). In further implementations, the power output 424 can be DC instead of AC and can be used to power equipment that require low voltages such as thermostats, for example. The relay 412b can also be used to drive a motor. For example, the terminal device 400 can be integrated into devices such as motorized window shade controllers and garage door openers. The energy metering Integrated Circuit (IC) 420 monitors current energy output to the equipment. Instructions executing on the microcontroller 410c can obtain energy consumption information from the energy metering IC 420 over time and store the information in the memory 410b for future reference.

In some implementations, the terminal device 400 is wirelessly coupled to a piece of equipment through the transceiver 410a. That is, the terminal device 400 using the transceiver 410a can communicate with a piece of equipment that is able to communicate wirelessly such as, for example, a wireless network enabled thermostat or a wireless network hub. In these implementations, the TRIAC/relay 412 and the energy metering IC 420 can be omitted from the terminal device 400 or be disabled.

The terminal device 400 can include one or more sensors and one or more user interface devices. For example, the terminal device 400 can include an ambient light sensor 422 that provides measurements of ambient light to the SoC 401. Instructions executed by the microcontroller 410c can use the ambient light measurement to direct the TRIAC 412a to change the power delivered to the equipment (e.g., a lamp) to adjust the light output of the lamp to compensate for the ambient light. Other sensors are possible. Additional example sensors are discussed further below in reference to FIG. 4B.

The user interface devices can include, for example, one or more light emitting diodes (LEDs) 414, one or more tactile buttons 416 (e.g., button 306 on smart plug 300), and a touch-sensitive display 418. For example, if terminal device 400 is integrated into a light switch, the light switch could be controlled by use of the touchscreen instead of the usual tactile toggle switch. Other user interface devices are possible.

Figure 4B:
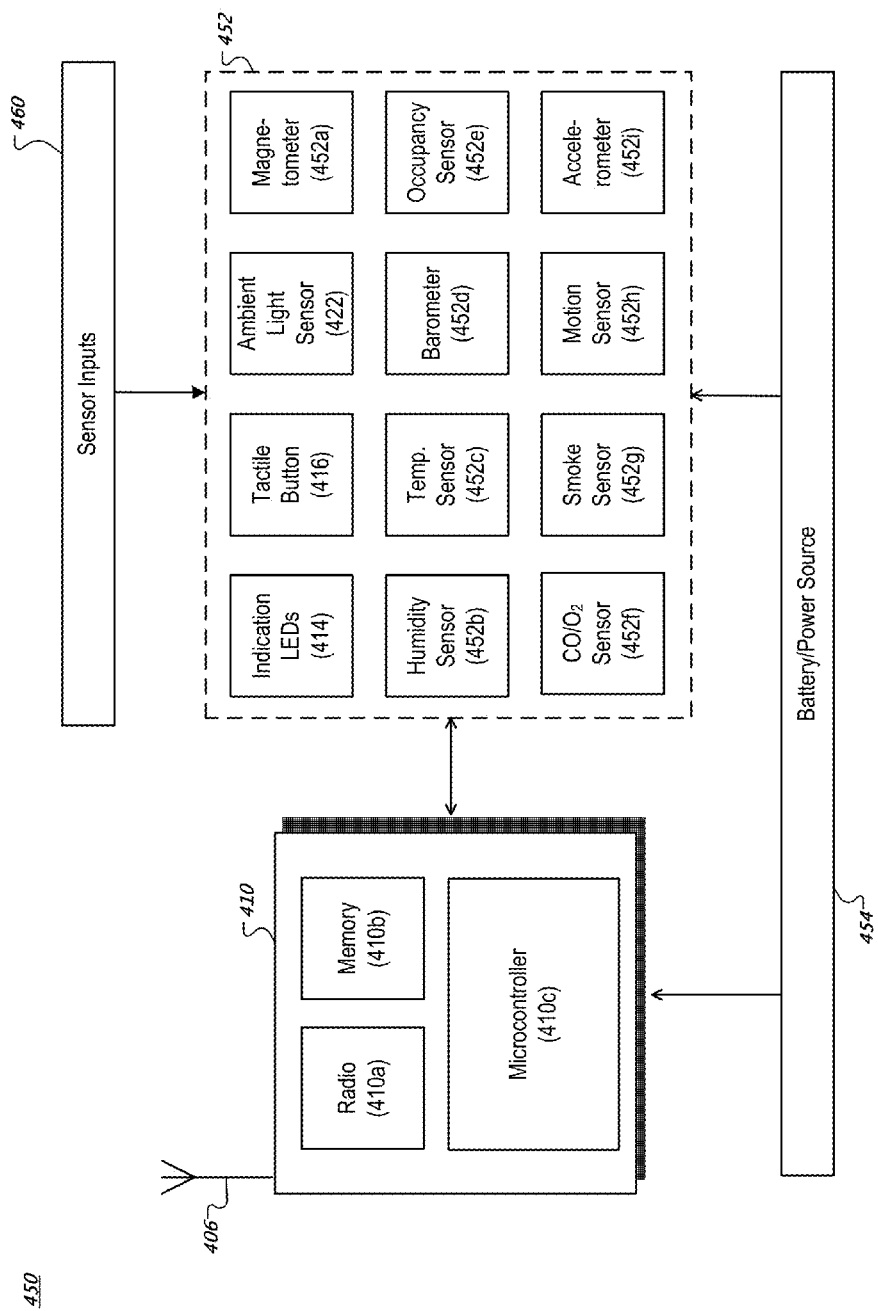
FIG. 4B illustrates components of another example terminal device.

FIG. 4B illustrates components of another example terminal device 450. The terminal device 450 can be used for monitoring objects or an environment. The terminal device 450 can be implemented as a separate device or can be integrated into another device (e.g., a thermostat). The terminal device 450 can contain fewer or more components than those illustrated in FIG. 4B. The terminal device 450 receives power input 454 (AC or DC) from a battery or other source such as an AC power input (e.g., from a wall socket). If the power input is AC, the power is converted to DC.

The DC output of the power source 454 powers the SoC 410 which, in some implementations, comprises a microcontroller 410c, a memory 410b, and a radio transceiver 410a. (See FIG. 4A.) The DC output of the power source 454 also powers one or more optional sensors 452. The sensors 452 provide input to the SoC 410. Instructions executed by the microcontroller 410c can utilize input received from the sensors and perform various functions in response. The indication LEDs 414, tactile button 416 and ambient light sensor were described above in regards to FIG. 4A. The sensors can receive input from sources external to the terminal device 450 through one or more sensor inputs 460.

The magnetometer 452a measures the strength and, in some implementations, the direction of magnetic fields. The magnetometer 452a can be used to sense whether windows or doors, for example, are open or closed when the magnetometer 452a's sensor input 460 is connected to a magnet that is attached to the window or door, for example. The accelerometer 452i measures proper acceleration and can be used in conjunction with the magnetometer 452a (as a compass) to detect three-dimensional movement. The humidity sensor 452b, temperature sensor 452c, and barometer 452d measure ambient humidity, temperature, and air pressure, respectively.

Motion sensor 452h detects motion in the environment surrounding the terminal device. The occupancy sensor 452e can include an infrared sensor and a proximity sensor to determine if there are people present in a space. The carbon monoxide/carbon dioxide sensor 452f can detect the presence of CO or $CO_2$ in the air, and the smoke sensor 452g can detect the presence of smoke in the air. Air can be sampled by the sensors through an air intake input 460, for example. One or more of these sensors can be incorporated into the terminal device 400.

Figure 5:
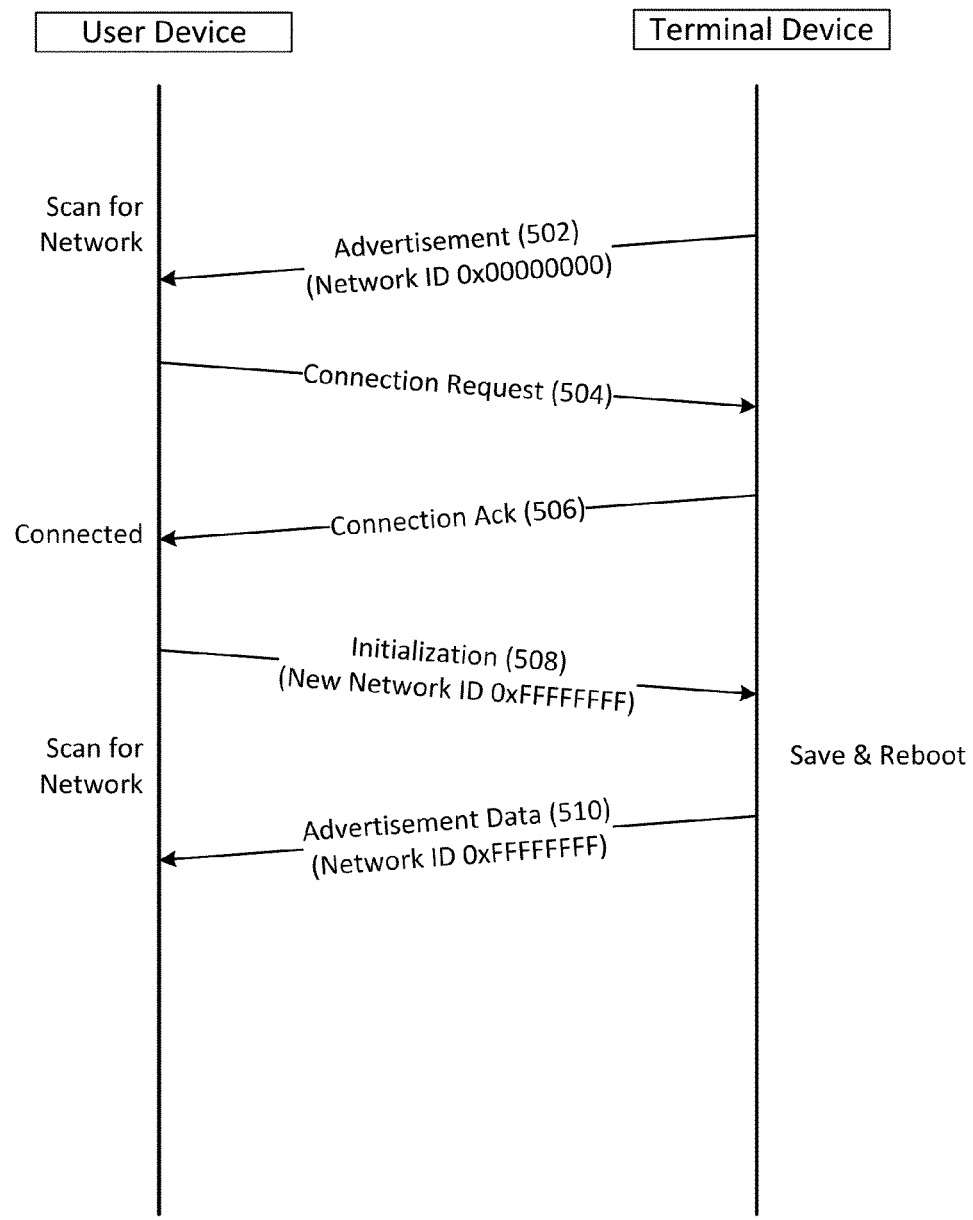
FIG. 5 illustrates an example initialization of a terminal device.

FIG. 5 illustrates an example initialization of a terminal device. To initialize a terminal device (e.g., terminal device 114), a user connects the terminal device to a power source such as a power socket and waits for their user device (e.g., user device 122) to receive an advertisement packet 502 from the terminal device. As discussed above, a terminal device makes its presence known to a user device by wirelessly broadcasting an advertisement packet 502 at various times or when prompted by a broadcast message sent by the user device. In some implementations, and as describe above, the advertisement packet 502 contains the transmit power of the terminal device, a terminal device identifier, status information, and a network identifier. The advertisement packet in some implementations is 27 bytes in length and the network identifier comprises 32 bits of a 128 bit field. If the terminal device has not been initialized, the network identifier is set to a predefined value (e.g., 0x00000000). Otherwise, the network identifier is set to the current value of the network identifier assigned to the terminal device. In some implementations, once a network identifier has been assigned to a terminal device, the terminal device can only be controlled by user devices which have permission to use the network identifier In further implementations, communication between the user device and the terminal device can be encrypted such that only the terminal device and the user device can decrypt messages sent between them.

Once the user device receives the advertisement packet 502 from the terminal device, the user device sends a connection request packet 504 to the user device. The destination address of the connection request packet 504 is the terminal device identifier obtained from the advertisement packet. The terminal device accepts the connection request packet 504 and sends a connection acknowledgement packet 506 to the user device in response. At this point, the user device and the terminal device are connected to each other.

After the connection is established, the user device provides an initialization packet to the terminal device which contains a network identifier and, optionally, one or more optional configuration parameters. The network identifier is determined by the user device and can be unique to the user of the user device. In some implementations, each terminal device initialized by the same user will be assigned the same network identifier. In further implementations, each network identifier is associated with a user account and a password. In order to access terminal devices having a given network identifier, the user associated with the network identifier must be logged into their account. This prevents other users from changing the configuration of terminal devices once they have been initialized by a particular user.

The optional configuration parameters can include a user specified name for the equipment coupled to the terminal device (e.g., "Bedside Lamp"), the equipment type (e.g., dimmable or non-dimmable light, television, appliance), and the name of the space which the terminal device is in (e.g., "Bedroom"). Alternatively, the configuration parameters could be stored on the user device instead of the transmitting them to the terminal device. Once the terminal device receives the initialization packet 508, the terminal device sets its network identifier to be the same as the network identifier (e.g., 0xFFFFFFFF) in the initialization packet. If there are any configuration parameters in the initialization packet, the terminal devices stores these values as well. After initialization, the terminal device will advertise its newly assigned network identifier (e.g., 0xFFFFFFFF) in the advertisement packet 510.

In some implementations, when initializing a terminal device, the user is required to stand a predetermined distance (e.g., 15 feet) from the terminal device so that the user device can obtain a RSSI measurement of the terminal device for future reference. The transmit power of all terminal devices can be set to the same value when the terminal devices are initialized in order to make the RSSI measurement consistent for all terminal devices. The user device associates the RSSI measurements for all terminal devices assigned to a given space with the name of the space. The distance computation for each RSSI measurement for terminal devices assigned to a particular space is a radius of a circle in which the respective terminal device is the center. The areas of the circles/spheres comprise the physical areas that make up the particular space in some implementations. These "charted" areas are used during trilateration to determine the current space of a user device.

The following example GUIs illustrated in FIGS. 6A-E can be presented on a display of the user device (e.g., user device 122) or on anther device such as, for example, a personal computer, a tablet computer, or a laptop computer.

Figure 6A:
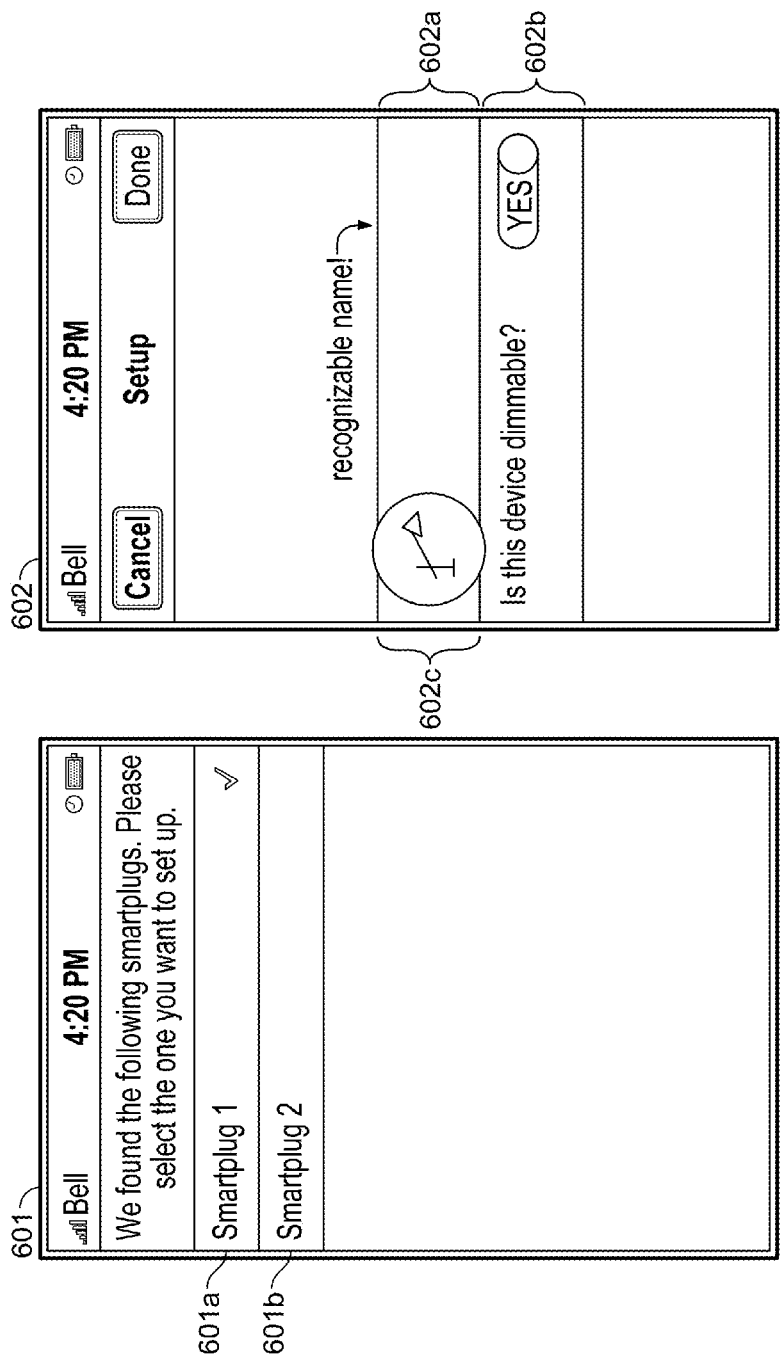
FIG. 6A illustrates example graphical user interfaces for configuring a terminal device.
Figure 6A:
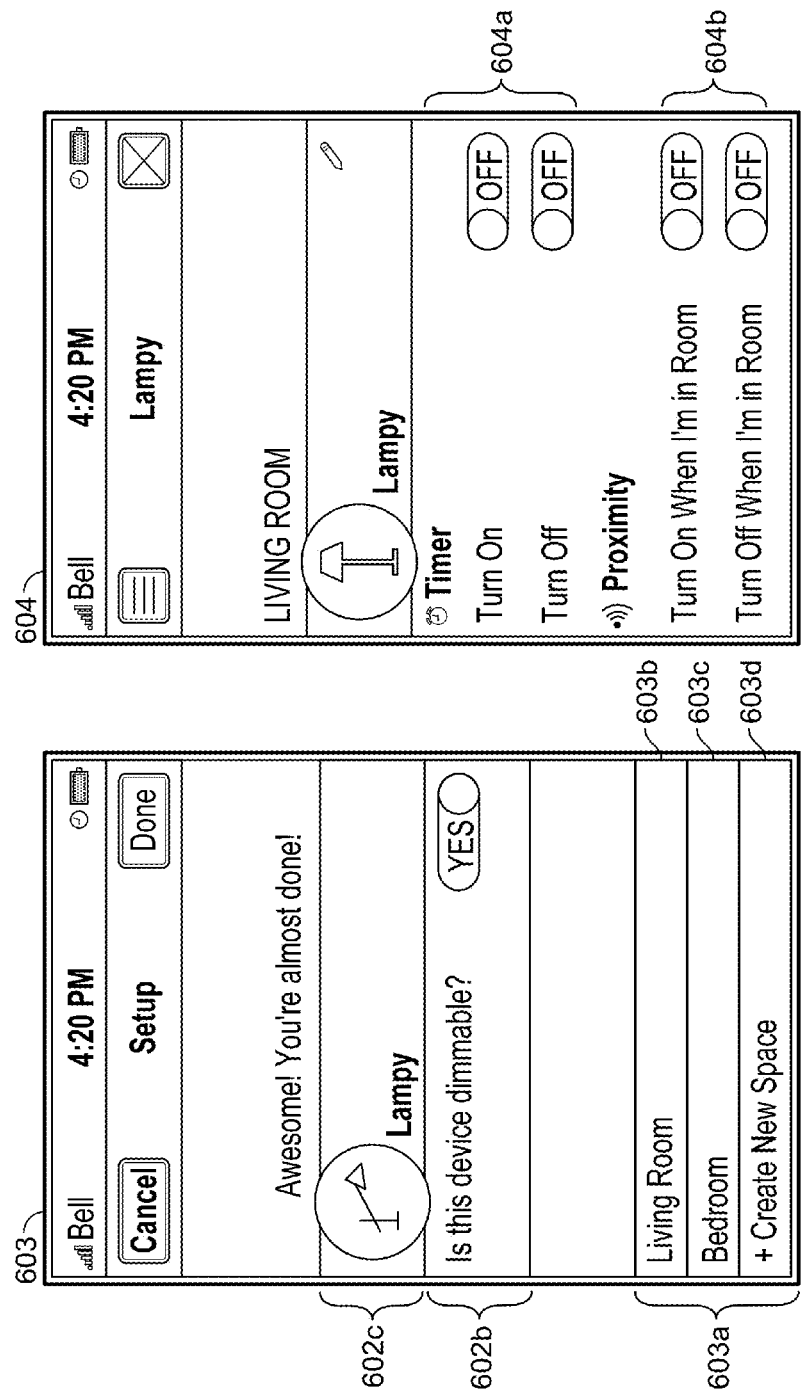

FIG. 6A illustrates example GUIs for configuring a terminal device. GUI 601 allows the user to select one of the terminal devices (terminal device 601a or terminal device 601b) to configure by touching the name of the terminal device ("Smartplug 1" or "Smartplug 2") with a finger or by speaking a command, for example. The terminal devices are terminal devices that the user device has received advertisement packets from, for example.

The selected terminal device's configuration is then presented in GUI 602. The GUI 602 allows a user to assign an icon 602c representative of the equipment type coupled to the terminal device. The GUI 602 also allows the user to assign an equipment type to the equipment if there is not already an equipment type assigned. In some implementations, selecting the icon 602c from a gallery of predefined icons, for example, also selects the equipment type. The configuration shown in GUI 602 is particular to the equipment type. Examples of types of equipment are lamps, motorized shades/curtains, televisions, heaters, appliances, stereo components, and so on. In this example, the equipment type is a lamp. The configuration for a simple lamp is a Boolean value indicating whether or not the lamp is dimmable 602b. The user can also assign a name to the equipment by typing or speaking the name in text input field 602a. (The user-specified lamp name in this example is "Lampy" as shown in GUI 603.) The user device can transmit the equipment configuration as well as a network identifier in an initialization packet 508 to the selected terminal device. The terminal device receives the configuration information and adjusts its settings accordingly. Once a terminal device is configured, the terminal device appears in the GUI as the user-provided equipment name or icon instead of as the name of a terminal device.

GUI 603 also allows the user to select a space to assign to the terminal device. The region 603a of the GUI 603 displays available spaces: Living Room 603b and Bedroom 603c. The user can also select 603d to create a new space. In this example, the user has assigned the Living Room 603b space to the terminal device.

GUI 604 shows additional configuration parameters for the lamp including a timer setting 604a and a proximity setting 604b. The timer setting 604a allows the user to set a schedule for when the lamp (or other equipment being configured) should be turned on and off by selecting buttons. For example, the user can set a weekday schedule and a weekend schedule. In some implementations, a so-called "vacation mode" time setting will cause the lamp to turn on and off at random times to give the appearance that someone is home. The proximity setting 604b can be configured so that the lamp (or other equipment being configured) is automatically turned on when the user device enters the space (e.g., "Living Room") or turns off when the user device enters the space. When the user device leaves the space, the lamp (or other equipment) returns to its prior configuration.

Figure 6B:
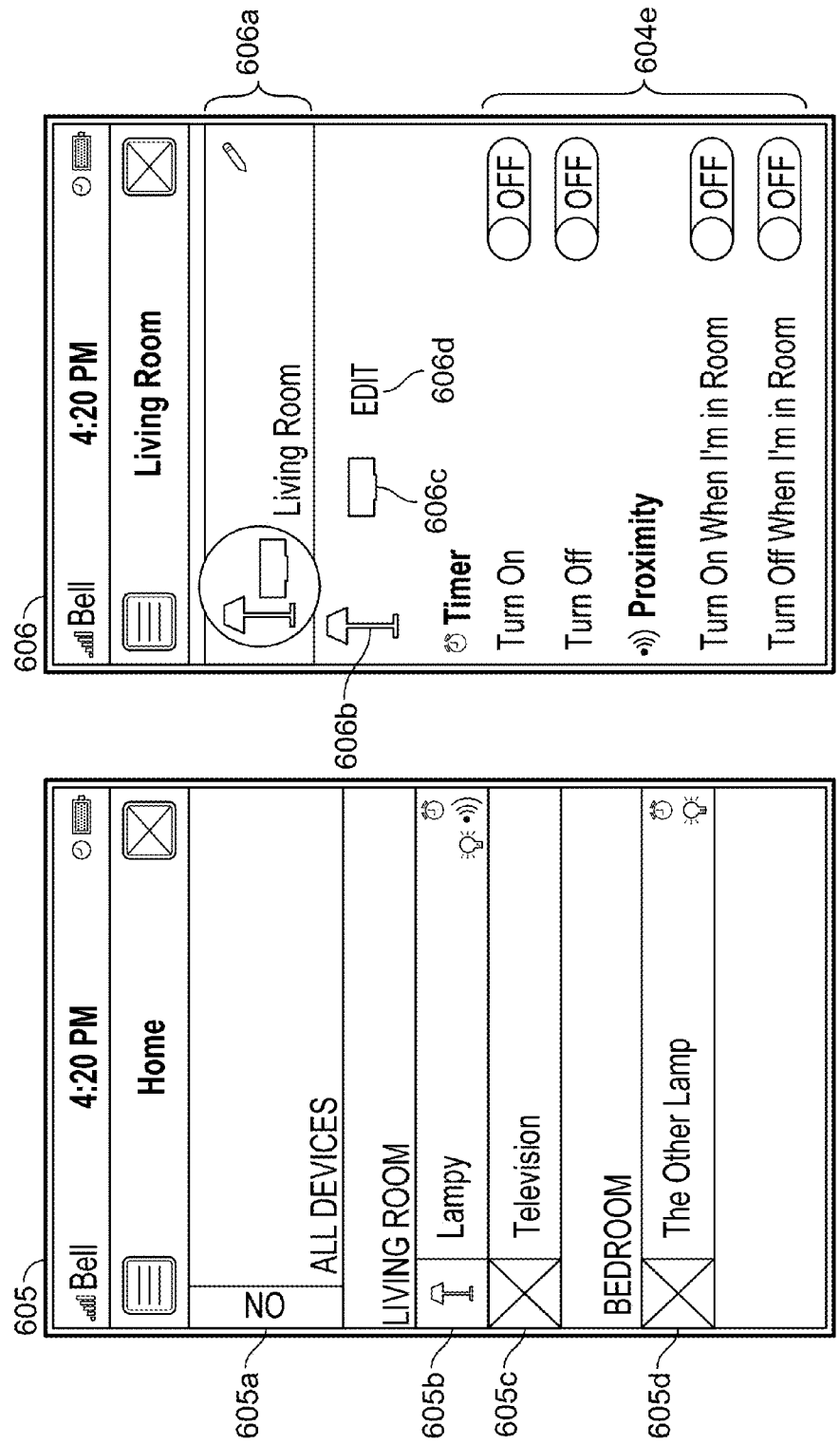
FIG. 6B illustrates example graphical user interfaces for configuring a space.

FIG. 6B illustrates example GUIs for configuring a space. GUI 605 allows a user to turn on all equipment in a space by selecting control 605a. For example, a quick finger swipe (or other user input) over control 605a will serve to turn on or off all equipment in all spaces. As shown in GUI 605, Lampy 605b and Television 605c are assigned to the Living Room space and The Other Lamp 605d is assigned to the Bedroom space. Swiping or selecting an individual equipment name (e.g., television 605c) will cause that equipment to be turned on or off (depending on the current state of the equipment).

GUI 606 allows control of a single space. A quick finger swipe (or other user input) over control 606a will serve to turn on or off all equipment in the space. The user can add or remove equipment assigned to the space by selecting the edit button 606d. The user can further configure a particular piece of equipment by selecting the equipment's icon (e.g., lamp icon 606b or television icon 606c). The configuration parameters for the selected piece of equipment appear in region 604e. In some implementations, GUI 606 automatically changes to the space that the user device is currently located. For example, in FIG. 1 the user device 122 displays the Living Room space 102 configuration for GUI 606 but when the user device is moved into the Bedroom space 104, the GUI 606 automatically changes to display the Bedroom space 104 configuration. In yet further implementations, floor plan can be displayed along with the GUI 606 to indicate the actually physical locations of equipment in the space.

Figure 6C:
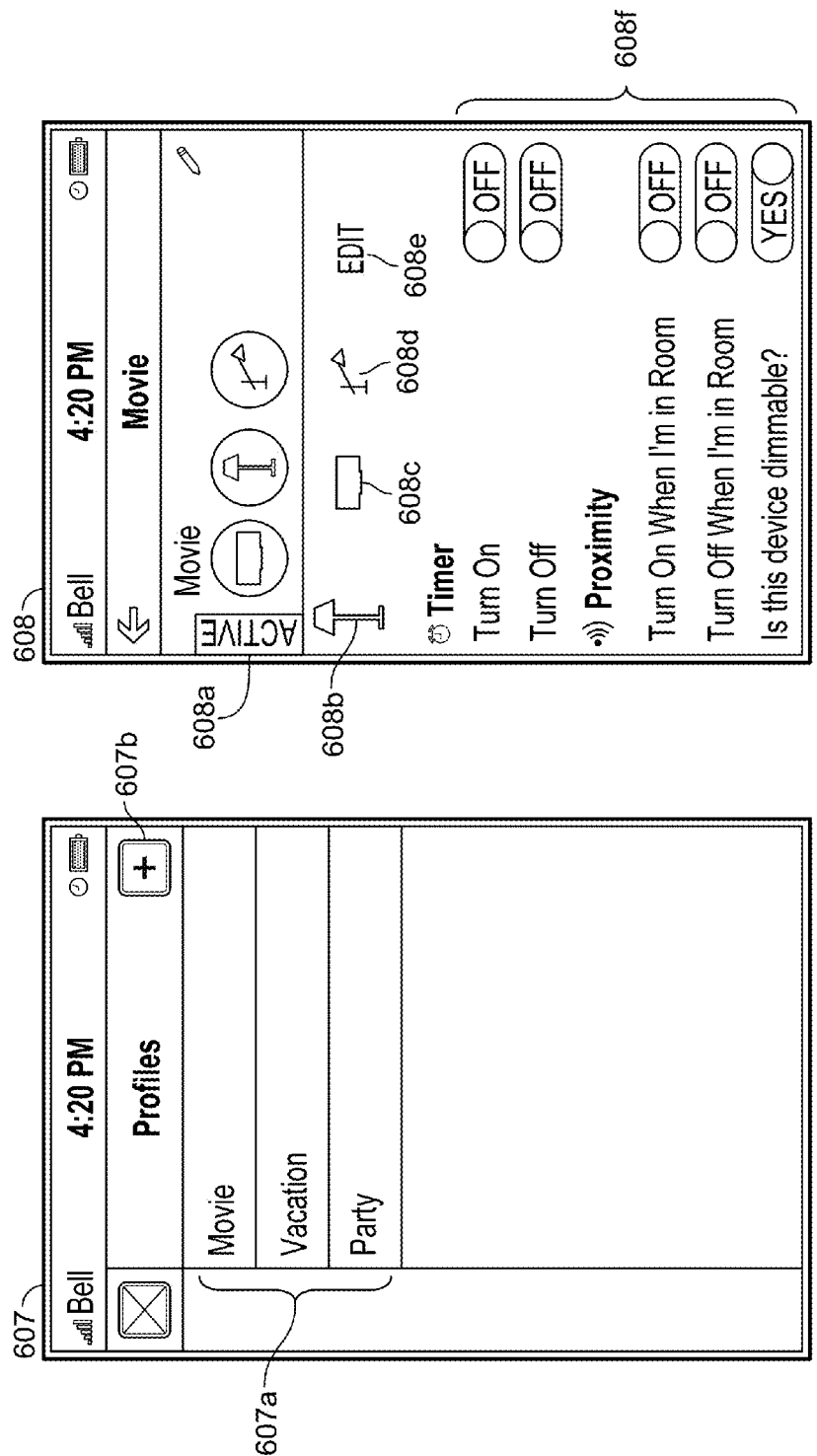
FIG. 6C illustrates example graphical user interfaces for configuring and activating profiles.

FIG. 6C illustrates example GUIs for configuring and activating profiles. Profiles are preset equipment settings for equipment in one or more spaces. A profile is assigned a name by a user. A profile can be activated or deactivated with a single user action, for example. In some implementations, once a profile is activated, the associated equipment settings override any current equipment settings (including timers in some implementations). In further implementations, when a profile is deactivated the prior settings of the equipment are restored.

GUI 607 is an example GUI for activating and deactivating profiles. The GUI 607 lists profiles that are already defined in area 607a. In some implementations, the GUI 607 indicates which profile(s) are currently active (not shown). In this example, the user-defined profiles are "Movie", "Vacation" and "Party". A profile can be activated or deactivated by user selection of the profile name, for example. Additional profiles can be added by user selection of the button 607b. GUI 608 is an example GUI for configuring a new or existing profile. In this example, the configuration is for a profile named "Movie". Indicator 608a designates whether the profile is currently active. The equipment controlled by the profile are listed in another region of the GUI 608. For instance, lamp 608b, television 608c, and lamp 608d are controlled by the "Movie" profile. Selection of any of the icons (608a, 608c, 608d) allows the user to edit the profile configuration for the corresponding equipment in region 608f.

Figure 6D:
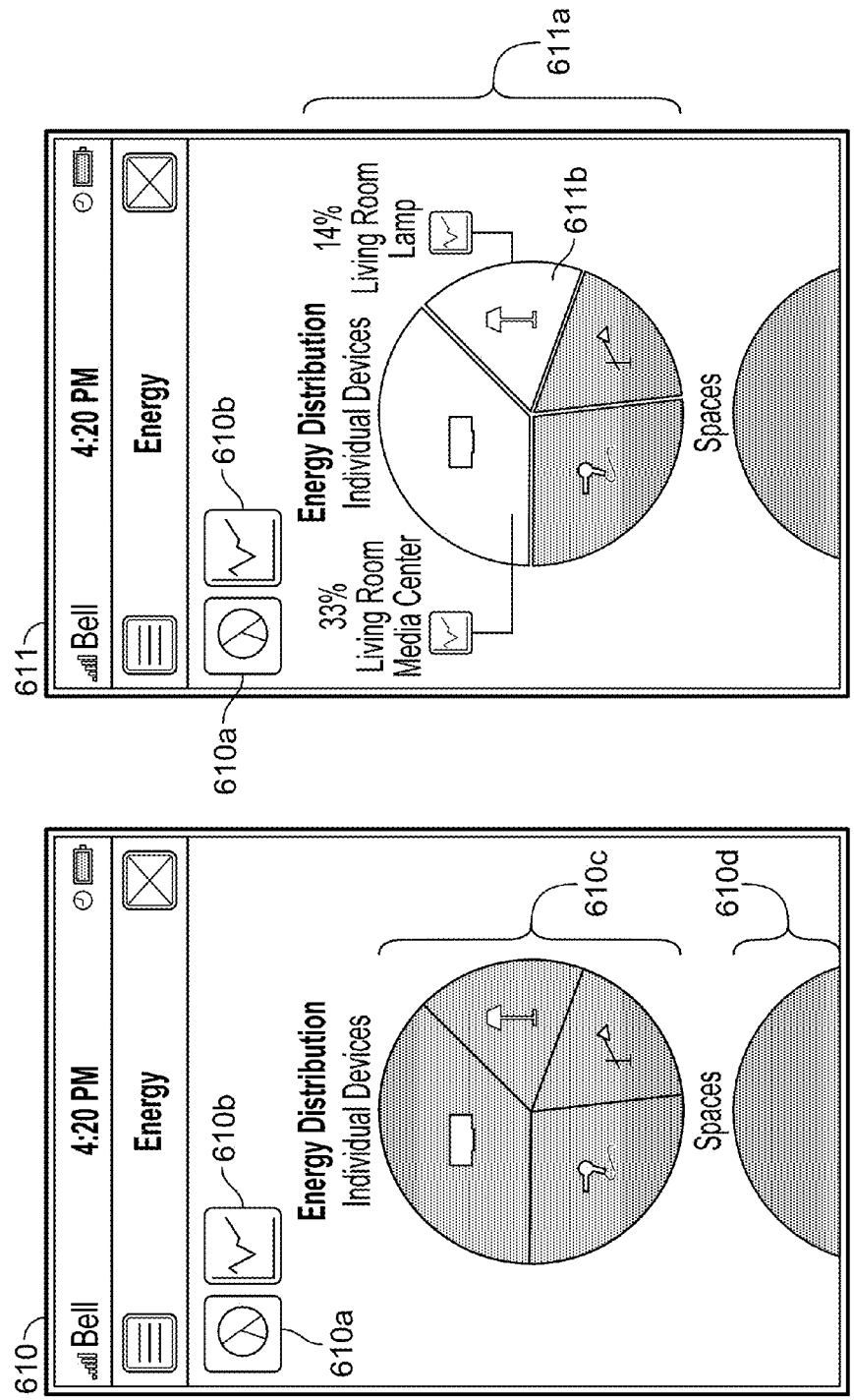
FIG. 6D illustrates example graphical user interfaces for exploring energy consumption.
Figure 6D:
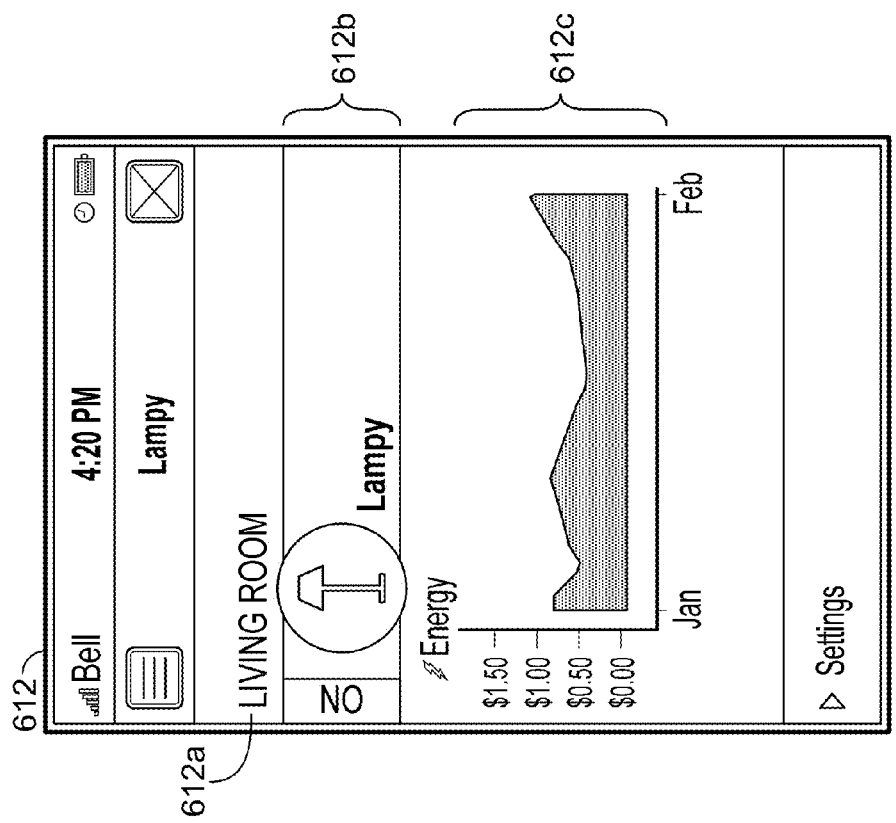

FIG. 6D illustrates example GUIs for exploring energy consumption. GUI 610 is an example GUI that illustrates energy consumption by different pieces of equipment. Pie chart 610c illustrates the percentage of total energy consumed for a given time period by each piece of equipment. Pie chart 610d (partially visible) illustrates the percentage of energy consumed by each space. User selection of button 610b causes the information to be displayed in a line graph instead of a pie chart. User selection of button 610a causes the information to be displayed in a pie chart. Other types of charts and graphs are possible. GUI 611 is an example GUI that illustrates energy consumption by different pieces of equipment in more detail by providing the numeric percentage consumed by each piece of equipment. Selection of a slice of the pie chart (e.g., slice 611b) causes presentation of GUI 612 including a chart 612c showing the energy consumption by the equipment "Lampy" 612b.

Figure 6E:
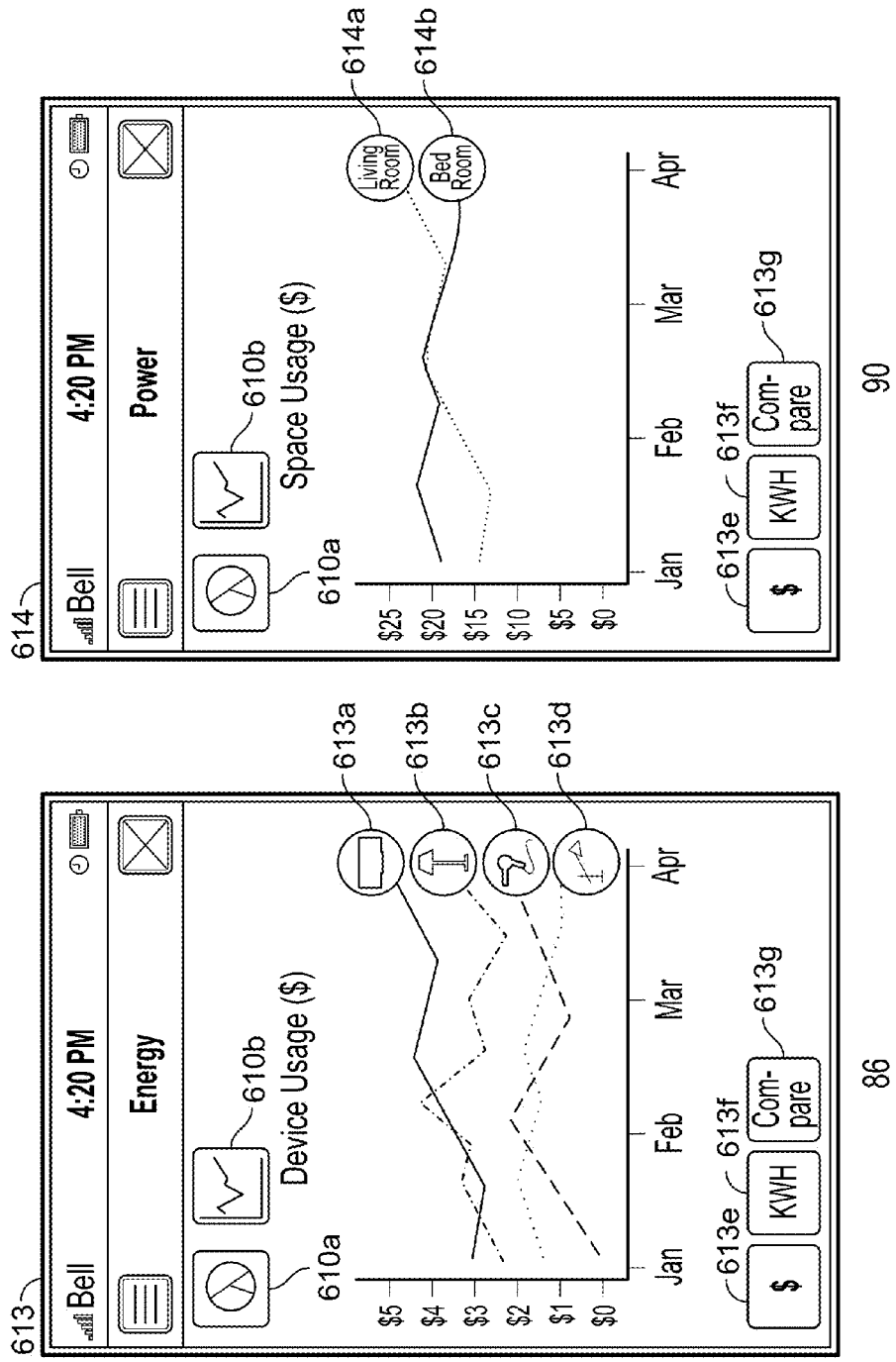
FIG. 6E illustrates example graphical user interfaces for exploring energy cost.
Figure 6E:
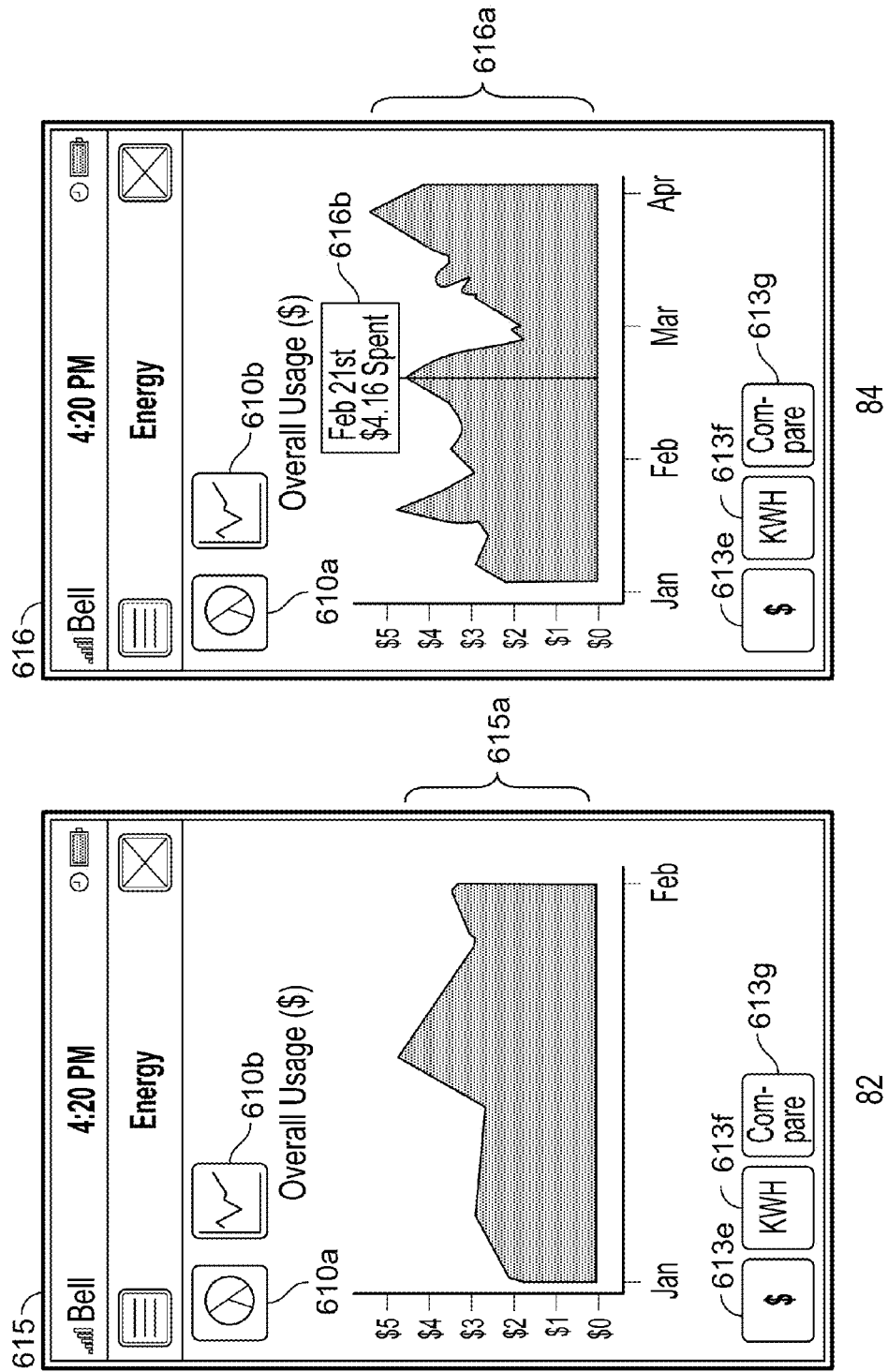

FIG. 6E illustrates example GUIs for exploring energy cost. GUI 613 is an example GUI for illustrating the energy cost in dollars (or some other currency), for example, for each piece of equipment as a function of time. In this example, the chart shows energy cost in dollars for a television 613a, a lamp 613b, an appliance 613c, and task light 613d. User selectable controls 613e-g allow user to view the chart in terms of cost 613e, kilowatt hours (kWh) 613f, or compare 613g the energy usage to those of similar households. GUI 614 is an example GUI for illustrating energy cost on a per spaces basis. For example, the Living Room space is illustrated by line 614a and the Bedroom space is illustrated by line 614b. As with GUI 613, user selectable controls 613e-g allow the user to view the chart in terms of cost 613e, kilowatt hours (kWh) 613f, or compare 613g the energy usage to those of similar households. GUI 615 is an example GUI that illustrates overall energy cost or kilowatt hours (kWh), of all pieces of equipment as shown in chart 615a. GUI 616 is an example GUI which allows a user to select a portion of the graph 616a (e.g., with a finger touch) to see detailed information 616b regarding the selected portion of the graph. In this example, the detailed information 616b indicates that the overall energy cost on February 21 was $4.16.

Figure 7:
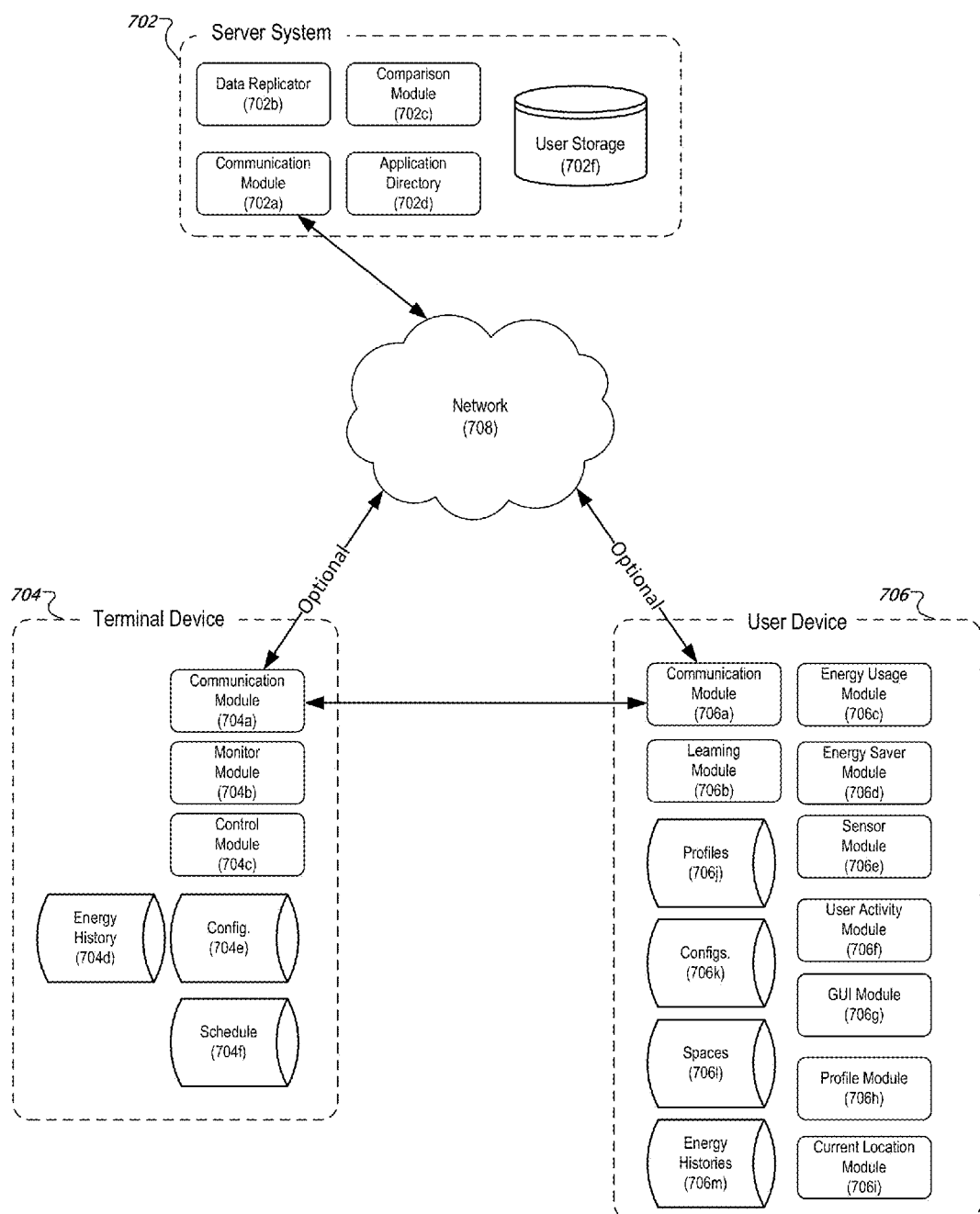
FIG. 7 is a block diagram illustrating an example system for monitoring and control of equipment.

FIG. 7 is a block diagram illustrating an example system 700 for monitoring and control of equipment on which the techniques described herein can be implemented. The system 700 includes one or more user devices 706, one or more terminal devices 704, and a server system 702.

Each user device 706 includes a communication module 706a, a learning module 706b, an energy usage module 706c, an energy saver module 706d, a sensor module 706e, a user activity module 706f, a GUI module 706g, a profile module 706h, a current location module 706i, storage for user profiles 706j, storage for equipment configurations 706k, storage for information about spaces 706l, and storage for equipment energy histories 706m. The modules 706a-i can be implemented as software, hardware or a combination of software and hardware that is executed on the user device. Fewer or more modules are possible. The storage 706j-m can be implemented as random access memory, Flash memory, or other types of persistent or non-persistent storage.

Each terminal device 704 includes a communication module 704a, a monitor module 704b, a control module 704c, storage for energy history 704d, storage for the terminal device's equipment configuration settings 704e, and storage for an equipment schedule 704f. The modules 704a-c can be implemented as software, hardware or a combination of software and hardware that is executed on the terminal device. Fewer or more modules are possible. The storage 706d-f can be implemented as Flash memory, read-only memory, or other types of persistent storage.

The server system 702 includes a communication module 702a, a data replicator module 702b, a comparison module 702c, an application directory module 702d, and storage for user data 702f. The modules 702a-d can be implemented as software, hardware or a combination of software and hardware that is executed on one or more data processing apparatus located in one or more geographic locations. Fewer or more modules are possible. The storage 702f can be implemented as random access memory, Flash memory, network accessible storage such as hard drives, or other types of persistent storage.

Network 708 can include a large computer network, examples of which include a local area network (LAN), wide area network (WAN), the Internet, a cellular network, or a combination thereof connecting a number of mobile computing devices, fixed computing devices, and server systems. The network(s) included in network 708 can provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Ethernet, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication can occur through a radio-frequency transceiver. In addition, short-range communication can occur, e.g., using a Bluetooth®, WiFi, or other such transceiver system.

The communication module 706a in the user device 706 can communicate wirelessly with one or more terminal devices (e.g., terminal device 704) using Bluetooth®, WiFi, or another wireless-protocol. The communication module 706a of the user device 706 receives an advertisement packet 502 transmitted by the communication module 704a of the terminal device 704. The communication module 706a can respond with a connection request 504 which is received by the terminal device 704's communication module 704a. In response, the communication module 704a transmits a connection acknowledgment 506 to the user device 706 indicating that a connection between the terminal device 704 and the user device 706 has been established.

Once a connection between the terminal device 704 and the user device 706 has been established by the respective communication modules, the user device 706 can transmit a command packet or an initialization packet 508 to the terminal device 704. Regarding the former, the command packet contains one or more equipment commands for the terminal device 704 to implement immediately, such as turning equipment coupled to the terminal device on or off. The commands can be implemented by the communication module 704a or the control module 704c, for example.

Configuration information for the terminal device 704 is stored in the equipment configurations 706k storage of the user device 706 by the GUI module 706g as part of the equipment configuration, for example (see FIG. 6A). The communication module 706a retrieves the stored configuration information and transmits it as configuration parameters in an initialization packet 508 to the terminal device 704. The terminal device 704's communication module 704a receives the initialization packet 508 and provides the network identifier and configuration parameters from the initialization packet 508 to the control module 704c. The control module 704c stores the network identifier and the configuration parameters in the equipment configuration settings 704e and then controls the equipment according to the received configuration parameters. The configuration parameters can specify, for example, the equipment type, whether the equipment is dimmable 602b (if the equipment is a light), an optional proximity configuration 604b, and an optional timer configuration 604a. The timer configuration is stored as a schedule for the equipment in the equipment schedule storage 704f. If a timer configuration is provided, the control module 704c will turn the equipment on and off according to the schedule.

The monitor module 704b of the terminal device 704 collects information regarding the equipment's energy usage over time and stores the information in the energy history storage 704d. For example, energy usage in terms of kilowatt hours (kWh) per hour per day for the last four months can be stored in the energy history storage 704d. The user device 706's energy usage module 706c can request the energy usage information from the terminal device 704 by causing the communication module 706a to transmit an energy history request packet to the user device 704. The communication module 704a of the terminal device 704 receives the energy history request packet from the user device 706 and, in response, causes the monitor module 704b to retrieve the energy history information from the storage 704d. The monitor module 704b then causes the communication module 704a to transmit the energy history information to the user device 706. The communication module 706a of the user device 706 receives the energy history information from the terminal device 704 and provides it to the energy usage module 706c. The energy usage module 706c stores the received energy history information in the storage for equipment energy histories 706m. The storage for equipment energy histories 706m is used by the GUI module 706g to display energy history information (see FIGS. 6D-6E).

The current location module 706i determines the current location of the user device 706 and takes appropriate action, if necessary, when a change in location is detected. The communication module 706a obtains RSSI values for terminal devices that it receives advertisement packets from. The communication module 706a provides the RSSI values to the current location module 706i which determines the current location as described above in regards to FIG. 1. When the current location of the user device 706 has changed to a new space, the current location module 706i signals the communication module 706a to transmit a packet announcing the presence of the user device 706 to terminal devices in the new space. In various implementations, the packet contains an identifier of the respective user device and the name of the new space. The terminal device communication modules 704a receive the packets and, in some implementations, save their respective equipment configurations in anticipation that the user device 706 will change the settings.

The current location module 706i determines what pieces of equipment are assigned to the new space. The configuration(s) of the equipment assigned to the new space are gathered from the configuration storage 706k and scanned to determine if any of the pieces of equipment has a proximity setting enabled (e.g., proximity setting 604b). If so, command packets are sent to the terminal devices coupled to those pieces of equipment to turn the equipment on or off according to the proximity settings. In further implementations, the current location module 706i signals the GUI module 706g to display the new space (e.g., in GUI 606).

In various implementations, when a user device 706 leaves a space (and enters a new space), the current location module 706i signals the communication module 706a to transmit a packet announcing the presence of the user device 706 to terminal devices in the new space. Terminal devices in the prior space that receive the packet can restore their saved equipment configurations if the configurations had been changed by the user device so that whatever state the space was in before the user device 706 entered is reinstated. If a particular terminal device in the prior space does not receive the packet, another terminal device that does receive it can forward the packet to the particular terminal device using the mesh network which was described above. Alternatively, or in addition to this, the communication module 704a of the terminal devices can be configured to periodically poll a user device 706 to see if the user device 706 is still in the space. If the user device 706 is unreachable or responds in the negative, then the terminal devices can restore their saved equipment configurations.

If a user device (user device 'B') has changed location to a new space and but there is already another user device (user device 'A') in the new space, one of the user devices will take priority over the other. In some implementations, the packet that announces to the terminal devices when a user device has newly entered the space contains priority information. If the priority information of user device B does not trump the priority information of user device A, then the terminal devices will ignore any command packets that user device B may transmit to the terminal devices. Otherwise, the terminal devices will save their respective equipment configurations in anticipation that user device B will change their equipment configurations. Priority among users can be established in a number of ways. If user A is a parent and user B is a child, for instance, then a rule can be established that the user device of a parent always has higher priority than that of a child. Or the user device that enters a space first has priority over other user devices that enter the space afterwards. Other types of rules are possible.

he user activity module 706f monitors user activities and, in some implementations, can perform one or more actions in response to detecting an activity of a user. An activity is, for example, watching a movie, playing an electronic game, activating a media controller, opening or closing a window or a door, adjusting a thermostat, turning an oven on or off, turning a fan on or off, or entering a bedroom after a particular time. Other types of activities are possible. The user activity module 706f of the user device 706 is made aware of a user activity through an activity update message that is received by the communication module 706a and delivered to the user activity module 706f. The activity update message indicates the type of activity the user is engaged in. The activity update message is generated in some implementations by an application programming interface (API) on the device (e.g., a set-top box, a wireless thermostat, and so on) that detects the user activity. Received activity update messages can cause the user activity module 706f to perform an action such as, for instance, sending a message to the user (e.g., "the living room window is open and rain is predicted) or sending a command packet to one or more pieces of equipment to, for example, dim the lights when the user activity is watching a movie, lower motorized blinds, or raise the indoor temperature. Actions can be defined programmatically through the API or interactively through use of a graphical user interface presented on the user device, for example. In some implementations, software applications that support the activity update API are registered in the server system 702's application directory 702d. The application directory 702d allows users to download the applications onto their user devices for adding activity-based functionality to the user device 706.

The learning module 706b tracks equipment usage patterns and activity patterns over time for one or more users. Tracking information for equipment usage comprises tuples of the following information: <user, time, terminal device, command>, where user identifiers the user, time indicates the time at which the command was sent by the user device of the user to the identified terminal device. Tracking information for activities comprises tuples of the following information: <user, time, activity, space>, where user identifies the user, time indicates the time at which the user commenced the activity identified by activity, and space identifies the space in which the activity was commenced. The user device 706 can store the tracked information locally or in the server system 702.

The learning module 706b can be derive patterns from the tracking information and use the patterns to automatically create timer settings (e.g., timer setting 604a) for equipment and define actions for the user activity module 706f. Patterns of equipment usage are derived for a given user by detecting that the user, at a given time of day or time range, causes a user device to transmit a particular command to a particular terminal device. For example, given the equipment usage tracking information:

<David, 5:00 PM Jan. 14, 2013, living room lamp, turn on>
<David, 5:16 PM Jan. 15, 2013, living room lamp, turn on>
<David, 4:50 PM Jan. 16, 2013, living room lamp, turn on>
<David, 5:05 PM Jan. 17, 2013, living room lamp, turn on> a pattern for user David can be deduced that specifies turning on the living room lamp each weekday at around 5:00 PM in the evening. A timer setting for the living room lamp can be created and stored as a schedule in the equipment schedule storage 704f. The control module 704c will turn the equipment on and off according to the schedule.

Patterns of activities are derived for a given user by detecting that the user device of the user, at a given time of day or time range, receives an activity update message. For example, given the equipment usage tracking information:

<Susan, 8:00 PM Jan. 14, 2013, play movie, bedroom>
<Susan, 8:22 PM Jan. 15, 2013, play movie, bedroom >
<Susan, 8:15 PM Jan. 17, 2013, play movie, bedroom > a pattern for user Susan can be deduced that specifies playing a movie in the bedroom each weekday at around 8:20 PM in the evening. An action can be automatically defined to dim lights in the bedroom at 8:20 PM each weekday.

The energy saver module 706d tracks occupancy patterns and energy usage patterns over time for one or more users. Tracking information for occupancy comprises tuples of the following information: <user, entry time, exit time, space>, where user identifiers the user, entry time is the time at which the user device of the user entered the space identified by space, and exit time is the time at which the user device of the user exited the space. The occupancy tracking information can be obtained from the current location module 706i, for example. Energy usage information comprises tuples of the following information: <on time, off time, terminal device, energy usage>, where on time is the time when equipment coupled to the terminal device identified by terminal device was turned on, off time is the time when equipment coupled to the terminal device was turned off, and energy usage indicates the amount of energy (e.g., kWh) consumed by the equipment during the time period between on time and off time. The energy usage information can be obtained from the energy usage module 706c, for example.

The energy saver module 706d can be derive occupancy and energy usage patterns from the tracking information. For example, after analyzing the occupancy tuples for a given user, the energy saver module 706d determines that user David is located in the bedroom space on average from 9:30 PM-6:30 AM weekdays, and is located in the living room space from 6:45 PM-9:20 PM weekdays. Other times David is not present in any of the spaces. The energy saver module 706d can analyze the energy usage tuples to determine times when equipment is consuming power and the amount of power consumed. By way of illustration, a lamp in the bedroom space consumes power from 6:45 PM-10:00 PM weekdays, even though user David occupies the living room for the majority of this time. The energy saver module 706d can compare occupancy patterns for a given user or users with energy usage patterns for one or more pieces of equipment to identify times when equipment is consuming power in unoccupied spaces. The energy saver module 706d can notify a user through the GUI module 706g to suggest turning off equipment in unoccupied spaces to save energy.

Additionally, the energy saver module 706d can compare activity patterns to energy consumption to suggest turning off equipment that is not needed for the given activity. Other types of comparisons are possible such as, for example, comparing the energy use of equipment in a home to similar homes in the same geographic area to suggest ways to save energy. The energy saver module 706d can compare the energy usage of one user to another for the same spaces and make suggestions to the user that consumes the most power regarding how that user could alter their use of equipment to correspond to that of the other user to reduce their power consumption.

The sensor module 706*e* obtains measurements from various physical sensors integrated into the user device and modifies configurations of one or more pieces of equipment based on the obtained measurements. By way of example, a sensor measurement is a measurement of motion from a motion detector sensor, a measure of ambient light from an ambient light sensor, a measurement of sound from a microphone, a measurement of ambient temperature from a thermometer, a measurement of physical location from a global positioning system, a measurement of touch from a touch-sensitive display device, a measurement of compass direction from a compass, a measurement of direction or intensity of a magnetic field from a magnetometer, a measurement of humidity from a humidity sensor, a measurement of atmospheric pressure from a barometer, a measurement of luminance from a light sensor, a measurement of orientation from an orientation sensor, or a measurement of proximity from a proximity sensor. Other measurements and sensors are possible.

The sensor module 706*e* obtains one or more sensor measurements and, if the sensor measurements match a predefined pattern, formulates a command for the communication module 706*a* to send to a terminal device in the current space (as determined by the current location module 706*i*) based on the measurements. As an example, the pattern can be a measurement of motion that indicates a substantially n upward or downward motion of the user device. (Instead of motion, the pattern can be a measurement of orientation that indicates vertical or horizontal orientation of the user device.) The upward or downward motion can trigger formulation of a command for a lamp or a speaker, for instance, to increase the brightness/sound volume or decrease the brightness/sound volume, respectively, of the lamp or speaker. The pattern can also be a measurement of sound that indicates a first sound followed by a second sound, where the second sound occurs within 5 seconds (or some other interval) after the first sound. The pattern can trigger formulation of a command for a lamp or other piece of equipment to turn on or turn off the piece of equipment. Other patterns are possible.

A measurement of ambient light can cause formulation of a command to raise or lower the brightness of a lamp or other piece of equipment to account for the ambient light. A measurement of ambient sound can cause formulation of a command to raise or lower the volume of a television or other piece of equipment to account for the ambient sound. A measurement of ambient temperature or humidity can cause formulation of a command to raise or lower the temperature of a thermostat, heater, fan, or other piece of equipment to account for the ambient temperature or humidity.

The profile module 706*h* manages profiles for users of the user device 706. Each user can have their own profiles. As described above in reference to FIG. 6C, profiles are present equipment settings for equipment in one or more spaces. When a user creates a profile (e.g., through user interaction with GUI 607 and GUI 608), the equipment settings for the profile are provided by the GUI module 706*g* to the profile module 706*h*. The profile module 706*h* associates the profile with the user and stores the profile in the profile storage 706*j*. Likewise, when a user edits a profile (e.g., through user interaction with GUI 607 and GUI 608), any changes to the equipment settings for the profile are provided by the GUI module 706*g* to the profile module 706*h*. The profile module 706*h* updates the profile in the profile storage 706*j* with the changed settings.

When a profile is activated (e.g., through user interaction with GUI 607), the GUI module 706*g* requests the profile from the profile module 706*h* and, in turn, the profile module 706*h* retrieves the profile from profile storage 706*j* and provides it to the GUI module 706*g*. The GUI module 706*g* converts the profile to one or more commands to change settings on one or more pieces of equipment and provides the commands to the communication module 706*a*. The communication module 706*a* transmits the commands to terminal devices for the equipment and thus activates the profile.

In addition, the GUI module 706*g* allows users to add equipment (e.g., through user interaction with GUIs 601 and 602) and modify settings of the equipment (e.g., through user interaction with GUI 604). The GUI module 706*g* stores the settings in configuration storage 706*k* and, when the user wishes to edit the settings for a piece of equipment, retrieves the settings from configuration storage 706*k*. When settings for a piece of equipment are changed, the GUI module 706*g* converts the settings to one or more commands to change the settings on the piece of equipment and provides the commands to the communication module 706*a*. The communication module 706*a* transmits the commands to the terminal device for the piece of equipment.

The GUI module 706*g* allows users to define spaces and activate or deactivate all of the equipment in a space (e.g., through user interaction with GUIs 605-606). A space definition comprises a name and the identity of one or more terminal devices in the space. The GUI module 706*g* stores new space definitions in spaces storage 706*l*. When a user wishes to turn on or turn off all equipment in a space (e.g., through interaction with GUI 606), the GUI module 706*g* generates one or more commands to send to the equipment in the space and invokes the communication module 706*a* to transmit the commands to the relevant terminal devices.

Finally, in addition to allowing users to create, edit and activate profiles, the GUI module 706*g* presents energy consumption information (e.g., in GUIs 610-616) culled from the energy history storage 706*m*.

Some implementations include a server system 702. The server system 702 provides data replication and other services to terminal devices and user devices. The communication module 702*a* of the server system 702 can communicate wirelessly with one or more terminal devices (e.g., terminal device 704) and user devices (e.g., user device 706) using Bluetooth®, WiFi, or another wireless-protocol. The data replicator module 702*b* of the server system replicates data stored on terminal devices (e.g., terminal device 704), user devices (e.g., user device 706), or both. For example, the data replicator receives energy history data (e.g., energy history data 704*d* or 706*m*) from the communication module 702*a*, associates the data with a given user, and stores the data in user storage 702*f*.

The energy history data can be "pulled" by the data replicator 702*b*, that is, the data replicator 702*b* can use the communication module 702*a* to send requests for the data to the terminal devices and/or user devices. Alternatively, the energy history data can be "pushed" to the server system 702 by the terminal devices and/or the user devices by the respective communication modules of the devices. For example, at various times the communication module 706*a* of the user device 706 can send updated energy history data to the server system 702 without prompting from the server system 702. Likewise, profiles in profile storage 706*b*, equipment settings in configuration storage 706k, and space definitions in space definition storage 706l can be pulled from the server system 702 or pushed to the server system 702. Having this information replicated in the server system 702 allows the information to be accessed and modified from different terminal and user devices as well as other data processing apparatus.

A comparison module 702c can compare energy usage for a given user with the energy use of users in similar dwellings and provide the comparison to the user by sending a message using the communication module 702a to the user device of the user. The message can be presented to the user by the GUI module 706g, for example.

An application directory module 702d provides software applications for download to user devices for adding activity-based functionality to the user devices. The software applications are programmed to send activity update messages using the API described above in regards to the user activity module 706f. Once downloaded, the programs can define actions on the user device The application directory 702d allows users to download the applications onto their user devices.

Figure 8:
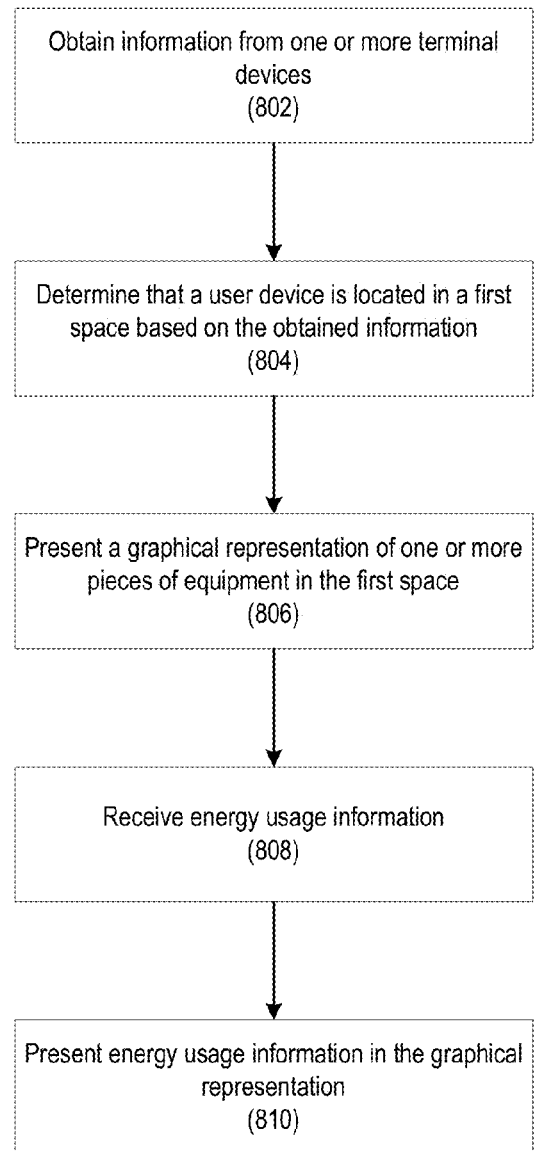
FIG. 8 is a flow chart of an example process for changing a graphical user interface to reflect the current location of a user device.

FIG. 8 is a flow chart of an example process 800 for changing a GUI to reflect the current location of a user device. The process 800 can be implemented, for example, by the current location module 706i, the GUI module 706g, and the communication module 706a in the user device 706 of FIG. 7. A user device wireless communicates with one or more terminal devices that are in range of the user device to obtain information from the terminal devices (e.g., communication module 706a; 802). Each of the terminal devices (e.g., terminal device 704) is configured to monitor a respective piece of equipment associated with the terminal device. The obtained information is used (e.g., by the current location module 706i) to determine that the user device is located in a first space of a physical structure (804). Responsive to determining that the user device is located in the first space, a graphical representation (e.g., GUI 606) of one or more pieces of equipment that are physically located in the first space is presented on the user device (e.g., by the GUI module 706g; 806). Energy usage information is received (e.g., by the communication module 706b) from one or more of the terminal devices (808). The received energy usage information is presented in the graphical representation (e.g., GUI 612; 810).

Figure 9:
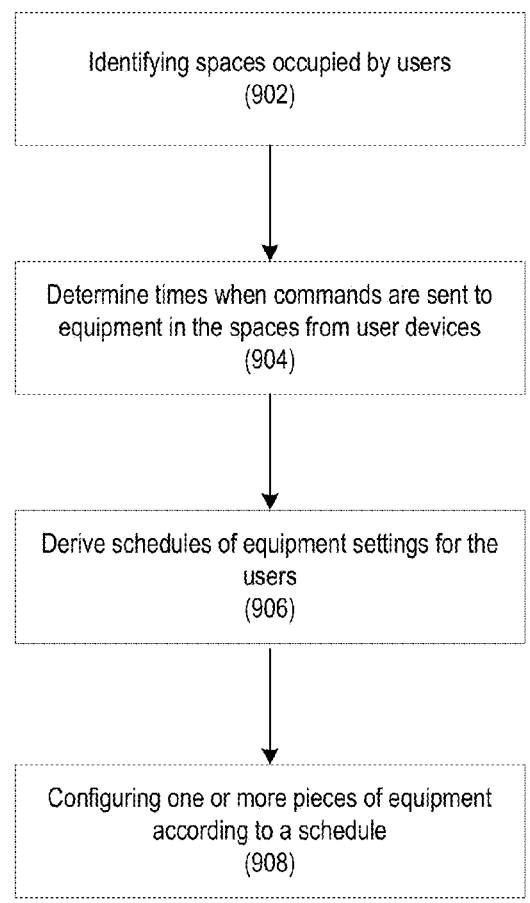
FIG. 9 is a flow chart of an example process for learning equipment configurations over time.

FIG. 9 is a flow chart of an example process 900 for learning equipment configurations over time. The process 900 can be implemented, for example, by the current location module 706i, the learning module 706b, and the energy saver module 706d of the user device 706 of FIG. 7. Different respective spaces occupied by users at different times are identified (902). The spaces can be identified by, for example, the current location module 706i. From this information, occupancy patterns for the users can be determined by, for example, the energy saving module 706d. Times at which the user device of each user sends one or more commands to one or more pieces of equipment in one or more of the spaces occupied by the user are determined (904). The times can be determined by, for example, the learning module 706b. A schedule of equipment settings is derived for each user based on the times at which the user device of the user sends commands to the pieces of equipment (906). The schedules can be determined by, for example, the learning module 706b. For a given user, the current space of the user is determined by the user device (e.g., current location module 706i) and based on the determination and the current time, one or more pieces of equipment are configured in the space according to the user's schedule (908).

Figure 10:
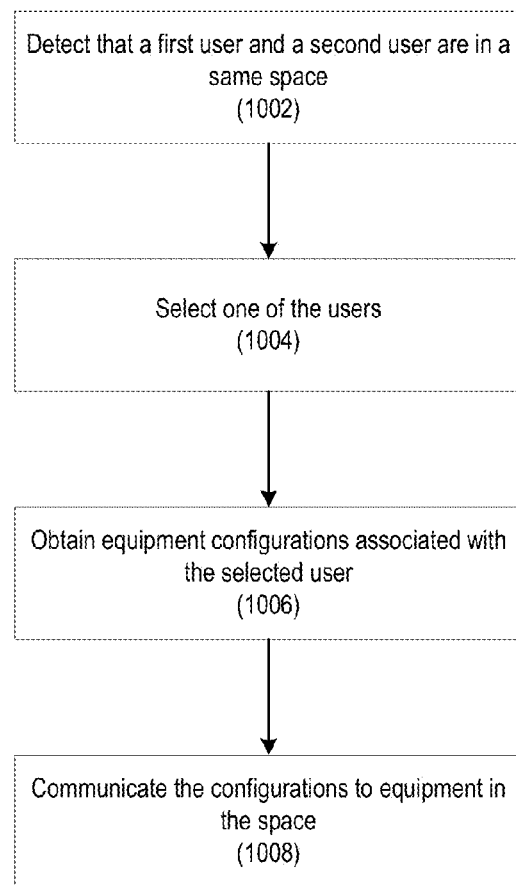
FIG. 10 is a flow chart of an example process for configuring terminal devices when more than one user device is in a space.

FIG. 10 is a flow chart of an example process 1000 for configuring terminal devices when more than one user device is in a space. The process 1000 can be implemented, for example, by the current location module 706i of the user device 706 of FIG. 7 or by the control module 704c of the terminal device 704. A first user and a second user are both detected as being present in a particular space of a physical structure (1002). The space comprises one or more terminal devices each being coupled to a respective piece of equipment and having a respective configuration. One of the users is selected where the selected user entered the particular space before the other user (1004). One or more configurations associated with the selected user are obtained, wherein each of the second configurations specifies respective configuration parameters for one of the pieces equipment (1006). Wirelessly communicating each obtained configuration to a different terminal device wherein the terminal device is configured to receive the obtained configuration wirelessly from the user device and configure the piece of equipment coupled to the terminal device with the second configuration (1008).

Figure 11:
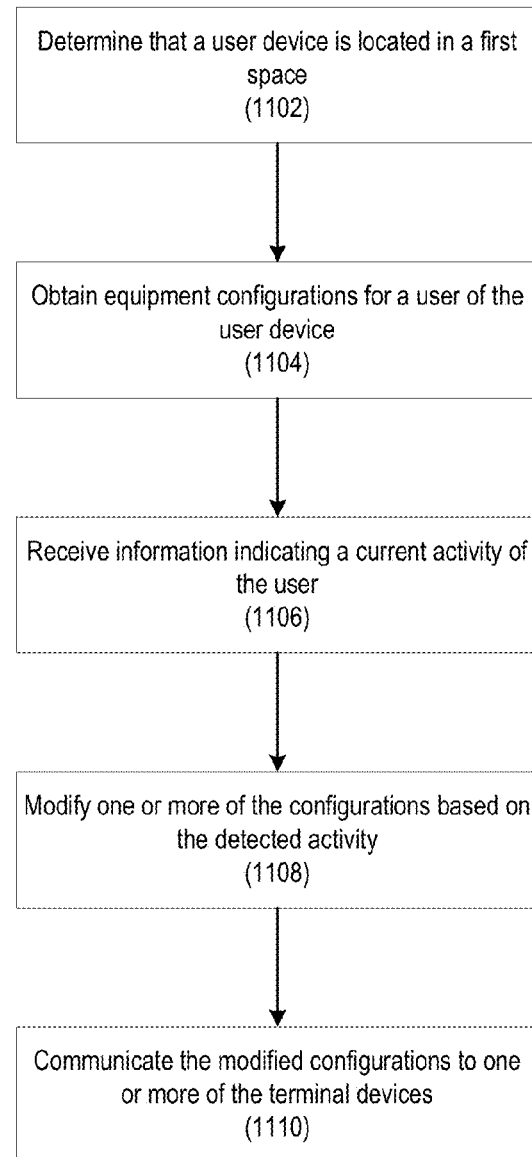
FIG. 11 is a flow chart of an example process for modifying equipment configurations based on user activity.

FIG. 11 is a flow chart of an example process 1100 for modifying equipment configurations based on user activity. The process 1100 can be implemented, for example, by the current location module 706i, the user activity module 706f, and the communication module 706a in the user device 706 of FIG. 7. A user device is determined to be located in a first space of a plurality of spaces of a physical structure (e.g., the current location module 706i; 1102). One or more respective configurations for a current user of the user device are obtained for one or more of pieces of equipment that are physically located in each of the one or more spaces, wherein each piece of equipment is associated with a respective terminal device that is configured to implement received configurations for the associated piece of equipment (1104). Information is received (e.g., by the user activity module 706f) indicating a current activity of the user (1106). One or more of the respective configurations are modified based on, at least, the current activity of the user (e.g., the user activity module 706f; 1108). The modified respective configurations are wirelessly communicated to one or more of the terminal devices (e.g., the communication module 706a; 1110).

Figure 12:
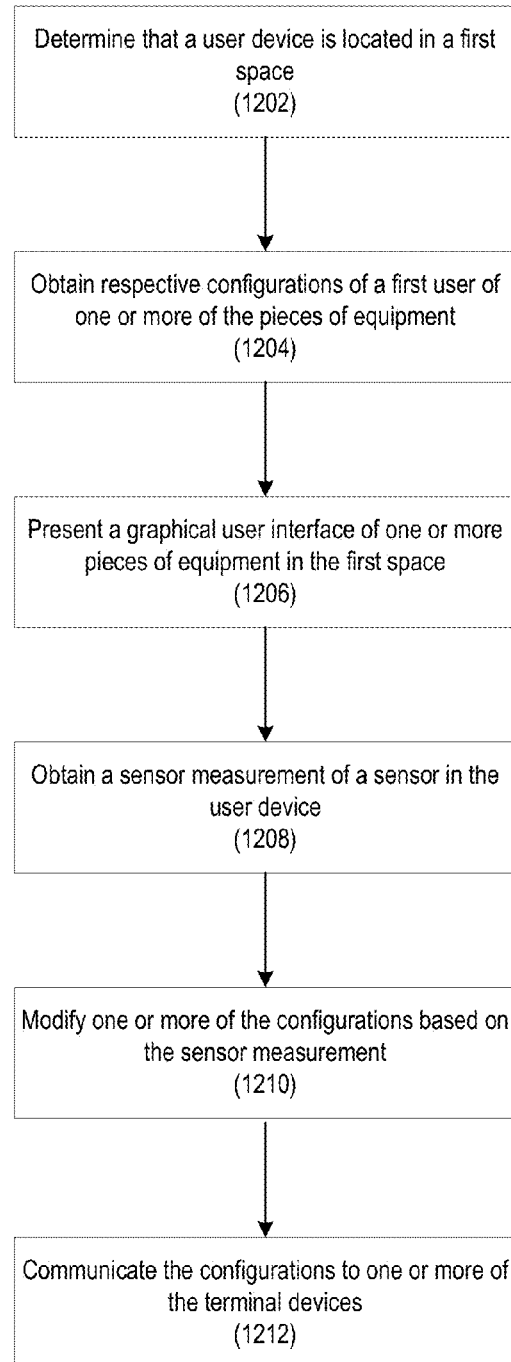
FIG. 12 is a flow chart of an example process for modifying equipment configurations based on user-device sensor measurements.

FIG. 12 is a flow chart of an example process 1200 for modifying equipment configurations based on user-device sensor measurements. The process 12 can be implemented, for example, by the sensor module 706e the user device 706 of FIG. 7. The user device is determined to be located in a first space of a plurality of spaces of a physical structure (1202). Respective configurations for one or more of pieces of equipment that are physically located in each of the one or more spaces are obtained, wherein each piece of equipment is associated with a respective terminal device that is configured to implement received configurations for the associated piece of equipment (1204). A sensor measurement of a sensor in the user device is obtained (1208). One or more of the respective configurations are modified based on, at least, the sensor measurement (1210). The modified respective configurations to are wirelessly communicated to one or more of the terminal devices (1212).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific embodiment details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A computer-implemented method comprising:
wirelessly receiving information by a user device during a first time period from each terminal device of a plurality of terminal devices that are in range of the user device, wherein the information includes signal strength indicators for each terminal device of the plurality of terminal devices, wherein each terminal device of the plurality of terminal devices is configured to monitor each respective piece of equipment, of a plurality of pieces of equipment, that is associated with each terminal device, and wherein each terminal device has a location in a particular space of a plurality of spaces of a physical structure;
determining that the user device is located in a first space of the plurality of spaces during the first time period based on the received information from the plurality of terminal devices including the signal strength indicators for each terminal device, wherein the user device location is associated with a user's current location;
responsive to determining that the user device is located in the first space, presenting a graphical representation of the plurality of pieces of equipment that are physically located in the first space wherein each respective piece of equipment of the plurality of pieces of equipment is associated with a different one of the plurality of terminal devices;
receiving energy usage information from each of the terminal devices that are associated with each respective piece of equipment of the plurality of pieces of equipment that is physically located in the first space, the energy usage information including a measure of an amount of energy used by each individual respective piece of equipment associated with each of the corresponding terminal device; and
presenting at least a portion of the received energy usage information in the graphical representation;
wirelessly receiving, by a particular one of the terminal devices, a communication from the user device wherein the communication includes settings for a particular piece of equipment of the plurality of pieces of equipment associated with the particular one of the terminal devices;
determining, by the particular terminal device, that the particular piece of equipment is not associated with the particular terminal device; and
wirelessly forwarding, by the particular terminal device, the communication to another terminal device of the plurality of terminal devices.

2. The method of claim 1, further comprising:
obtaining respective settings of a first user for the plurality of pieces of equipment that are located in the first space; and
wirelessly communicating by the user device the respective settings of the first user to the terminal devices that are associated with said each respective piece of equipment of the plurality of pieces of equipment located in the first space wherein the terminal devices are further configured to implement the respective settings of the first user.

3. The method of claim 1, further comprising:
determining, during a second time period following the first time period, that the user device is located in a second space of the plurality of spaces; and
responsive to determining that the user device is located in the second space, presenting a graphical representation of the plurality of pieces of equipment that are physically located in the second space wherein each respective piece of equipment of the plurality of pieces of equipment located in the second space is associated with a respective second terminal device that is configured to monitor the plurality of pieces of equipment.

4. The method of claim 1, further comprising:
receiving user selection of the graphical representation of the plurality of pieces of equipment located in the first space or of a graphical representation of a control for the plurality of pieces of equipment located in the first space; and responsive to the user selection, changing one or more settings for the selected piece of equipment of the plurality of pieces of equipment.

5. The method of claim 1, further comprising:
receiving a user voice command identifying a piece of equipment of the plurality of pieces of equipment in the graphical representation; and
responsive to receiving the command, changing one or more settings for the identified piece of equipment of the plurality of pieces of equipment based on the command.

6. The method of claim 1 wherein presenting the graphical representation of the plurality of pieces of equipment that are physically located in the first space comprises presenting a floor plan for the first space wherein the floor plan indicates a respective location of each respective piece of equipment of the plurality of pieces of equipment located in the first space.

7. The method of claim 6, further comprising:
receiving user selection of one of the plurality of pieces of equipment indicated on the floor plan of a graphical representation of a control for the plurality of pieces of equipment indicated on the floor plan; and
responsive to the user selection, changing one or more settings for the selected piece of equipment.

8. The method of claim 1 wherein each terminal device is configured to monitor one or more following attributes of each respective piece of equipment of the plurality of pieces equipment associated with each terminal device: energy usage, a change in the environment, temperature, humidity, atmospheric pressure, whether the respective piece of equipment is open or closed, and whether the respective piece of equipment is enabled or disabled.

9. The method of claim 1 wherein the plurality of pieces of equipment is associated with respective settings comprising one or more of: on, off, dimming level, high energy state, low energy state, energy savings mode, temperature, or television channel.

10. The method of claim 1 wherein the user device is a smartphone or a tablet computer.

11. The method of claim 1 wherein each respective piece of equipment of the plurality of pieces of equipment is an appliance, a light, a door lock, a thermostat, or a media controller.

12. The method of claim 1 wherein presenting the graphical representation of the plurality of pieces of equipment further comprises presenting the energy usage information for the plurality of pieces of equipment that are physically located in one or more spaces other than the first space.

13. The method of claim 1 wherein each respective piece of equipment is associated with each corresponding terminal device when each corresponding terminal device is physically or wirelessly connected to said each respective piece of equipment.

14. The method of claim 1, wherein presenting the received energy usage information in the graphical representation includes presenting a graph illustrating a respective percentage of energy consumed by each respective piece of equipment in the first space of the plurality of spaces, and further comprising:
in response to the user changing current location from the first space to a second space of the plurality of spaces, receiving energy usage information from second terminal devices of the plurality of terminal devices that are each associated with a respective second piece of equipment of the plurality of pieces equipment that is physically located in the second space, the energy usage information from the second terminal devices including a measure of an amount of energy used by each individual respective second piece of equipment located in the second space associated with the corresponding second terminal device; and
presenting at least a portion of the received energy usage information from the second terminal devices in the graphical representation.

15. The method of claim 1, wherein presenting the received energy usage information in the graphical representation includes presenting a graph illustrating total energy consumption by equipment located in each space of the plurality of spaces.

16. The method of claim 1, further comprising:
determining that the user device is located in a second space of the plurality of spaces during a second time period;
receiving energy usage information from second terminal devices that are each associated with a respective second piece of equipment of the plurality of pieces of equipment that is physically located in the second space, the energy usage information from the second terminal devices including a measure of an amount of energy used by each individual respective second piece of equipment associated with the corresponding second terminal device of the second terminal devices; and
presenting at least a portion of the received energy usage information from the second terminal devices in the graphical representation.

17. A system comprising:
data processing apparatus programed to perform operations comprising:
wirelessly receiving information by a user device during a first time period from each terminal device of a plurality of terminal devices that are in range of the user device, wherein the information includes signal strength indicators for each terminal device of the plurality of terminal devices, wherein each terminal device of the plurality of terminal devices is configured to monitor each respective piece of equipment, of a plurality of pieces of equipment, that is associated with each terminal device, and wherein each terminal device has a location in a particular space of a plurality of spaces of a physical structure;
determining that the user device is located in a first space of the plurality of spaces during the first time period based on the received information from the plurality of terminal devices including the signal strength indicators for each terminal device, wherein the user device location is associated with the a user's current location;
responsive to determining that the user device is located in the first space, presenting a graphical representation of the plurality of pieces of equipment that are physically located in the first space wherein each respective piece of equipment of the plurality of pieces of equipment is associated with a different one of the plurality of terminal devices;
receiving energy usage information from each of the terminal devices that are associated with each respective piece of equipment of the plurality of pieces of equipment that is physically located in the first space, the energy usage information including a measure of an amount of energy used by each individual respective piece of equipment associated with each of the corresponding terminal device; and
presenting at least a portion of the received energy usage information in the graphical representation;

wirelessly receiving, by a particular one of the terminal devices, a communication from the user device wherein the communication includes settings for a particular piece of equipment of the plurality of pieces of equipment associated with the particular one of the terminal devices;

determining, by the particular terminal device, that the particular piece of equipment is not associated with the particular terminal device; and wirelessly forwarding, by the particular terminal device, the communication to another terminal device of the plurality of terminal devices.

18. The system of claim 17, further comprising:

obtaining respective settings of a first user for the plurality of pieces of equipment that are located in the first space; and wirelessly communicating by the user device the respective settings of the first user to the terminal devices that are each terminal device associated with each respective piece of equipment of the plurality of pieces of equipment located in the first space wherein the terminal devices are further configured to implement the respective settings of the first user.

19. The system of claim 17, further comprising:

determining, during a second time period following the first time period, that the user device is located in a second space of the plurality of spaces; and responsive to determining that the user device is located in the second space, presenting a graphical representation of the plurality of pieces of equipment that are physically located in the second space wherein each respective piece of equipment of the plurality of pieces of equipment located in the second space is associated with a respective second terminal device that is configured to monitor the plurality of pieces of equipment.

20. The system of claim 17, further comprising:

receiving user selection of the graphical representation of the plurality of pieces of equipment located in the first space or of a graphical representation of a control for the plurality of pieces of equipment located in the first space; and responsive to the user selection, changing one or more settings for the selected piece of equipment of the plurality of pieces of equipment.

21. The system of claim 17, further comprising:

receiving a user voice command identifying a piece of equipment of the plurality of pieces of equipment in the graphical representation; and responsive to receiving the command, changing one or more settings for the identified piece of equipment of the plurality of pieces of equipment based on the command.

22. The system of claim 17 wherein presenting the graphical representation of the plurality of pieces of equipment that are physically located in the first space comprises presenting a floor plan for the first space wherein the floor plan indicates a respective location of each respective piece of equipment of the plurality of pieces of equipment located in the first space.

23. The system of claim 22, wherein the operations further comprise:

receiving user selection of one of the plurality of pieces of equipment indicated on the floor plan of a graphical representation of a control for the plurality of pieces of equipment indicated on the floor plan; and responsive to the user selection, changing one or more settings for the selected piece of equipment.

24. The system of claim 17 wherein each terminal device is configured to monitor one or more following attributes of each respective piece of equipment of the plurality of pieces equipment associated with each terminal device: energy usage, a change in the environment, temperature, humidity, atmospheric pressure, whether the respective piece of equipment is open or closed, and whether the respective piece of equipment is enabled or disabled.

25. The system of claim 17 wherein the plurality of pieces of equipment is associated with respective settings comprising one or more of: on, off, dimming level, high energy state, low energy state, energy savings mode, temperature, or television channel.

26. The system of claim 17 wherein the user device is a smartphone or a tablet computer.

27. The system of claim 17 wherein each respective piece of equipment of the plurality of pieces of equipment is an appliance, a light, a door lock, a thermostat, or a media controller.

28. The system of claim 17 wherein presenting the graphical representation of the plurality of pieces of equipment further comprises presenting the energy usage information for the plurality of pieces of equipment that are physically located in one or more spaces other than the first space.

29. The method of claim 1 wherein each respective piece of equipment is associated with each corresponding terminal device when each corresponding terminal device is physically or wirelessly connected to each respective piece of equipment.

* * * * *